United States Patent
Merz et al.

(10) Patent No.: US 11,727,462 B2
(45) Date of Patent: Aug. 15, 2023

(54) SYSTEM, METHOD, AND NON-TRANSITORY COMPUTER-READABLE STORAGE MEDIA FOR RECOMMENDING MERCHANTS

(71) Applicant: MASTERCARD INTERNATIONAL INCORPORATED, Purchase, NY (US)

(72) Inventors: Christopher J. Merz, Wildwood, MO (US); Walter Lo Faro, Chesterfield, MO (US); Adam K. Hosp, Lake Saint Louis, MO (US); Matthew Richard Stocke, Glendale, MO (US); Stephen P. Hendrix, Saint Charles, MO (US); Robert T. Grothe, Jr., Kirkwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 142 days.

(21) Appl. No.: 16/593,420

(22) Filed: Oct. 4, 2019

(65) Prior Publication Data
US 2020/0034913 A1    Jan. 30, 2020

Related U.S. Application Data

(63) Continuation of application No. 13/797,400, filed on Mar. 12, 2013, now Pat. No. 10,438,269.

(51) Int. Cl.
*G06Q 30/0601* (2023.01)
*G06Q 30/0282* (2023.01)

(52) U.S. Cl.
CPC ..... *G06Q 30/0631* (2013.01); *G06Q 30/0282* (2013.01)

(58) Field of Classification Search
CPC .......... G06Q 30/0631; G06Q 30/0282; G06Q 30/0601–0645
(Continued)

(56) References Cited

U.S. PATENT DOCUMENTS 5,025,138 A    6/1991  Cuervo
6,249,755 B1   6/2001  Yemini et al.
(Continued)

FOREIGN PATENT DOCUMENTS

JP    2008282098 A    11/2008
JP    2012079268 A     4/2012
(Continued)

OTHER PUBLICATIONS

"Matrix Factorization Techniques for Recommender Systems." IEEE.org. Aug. 7, 2009. (Year: 2009).*
(Continued)

*Primary Examiner* — Allison G Wood
(74) *Attorney, Agent, or Firm* — Armstrong Teasdale LLP

(57) ABSTRACT

A computer system for recommending merchants to a candidate cardholder is provided. The computer system includes a memory device in communication with a processor. The processor is programmed to receive transaction information for a plurality of cardholders from a payment network. The transaction information includes data relating to purchases made by the cardholders at a plurality of merchants, the purchases satisfying a first criteria. The processor receives candidate cardholder preference information for at least one of the merchants input by the candidate cardholder. The computer system determines a merchant rank for each merchant based on the received transaction information and the candidate cardholder preference information, and determines a neutral merchant rank for each merchant based on the received transaction information and neutral cardholder preferences of the plurality of cardholders. The computer system also determines a merchant score for each of the plurality of merchants by comparing the merchant rank to the neutral merchant rank.

19 Claims, 17 Drawing Sheets

(58) Field of Classification Search
USPC .................................. 705/26.1–27.2, 26.7
See application file for complete search history.

(56) References Cited

U.S. PATENT DOCUMENTS

| | | |
|---|---|---|
| 6,327,574 B1 | 12/2001 | Kramer et al. |
| 6,505,168 B1 | 1/2003 | Rothman et al. |
| 6,738,761 B1 | 5/2004 | Oura |
| 6,782,370 B1 | 8/2004 | Stack |
| 6,801,909 B2 | 10/2004 | Delgado et al. |
| 6,842,737 B1 | 1/2005 | Stiles et al. |
| 7,181,438 B1 | 2/2007 | Szabo |
| 7,197,474 B1 | 3/2007 | Kitts |
| 7,269,568 B2 | 9/2007 | Stiles et al. |
| 7,391,781 B2 | 6/2008 | Payne et al. |
| 7,546,254 B2 | 6/2009 | Bednarek |
| 7,685,232 B2 | 3/2010 | Gibbs et al. |
| 7,792,697 B2 | 9/2010 | Bhagchandani et al. |
| 7,848,950 B2 | 12/2010 | Herman et al. |
| 7,925,540 B1 | 4/2011 | Orttung et al. |
| 7,958,066 B2 | 6/2011 | Pinckney et al. |
| 7,966,282 B2 | 6/2011 | Pinckney et al. |
| 8,005,832 B2 | 8/2011 | Andrieu |
| 8,032,480 B2 | 10/2011 | Pinckney et al. |
| 8,032,481 B2 | 10/2011 | Pinckney et al. |
| 8,180,702 B2 | 5/2012 | Debow |
| 8,185,487 B2 | 5/2012 | Tuzhilin et al. |
| 8,190,478 B2 | 5/2012 | Herman et al. |
| 8,204,784 B2 | 6/2012 | Bhagchandani et al. |
| 8,255,263 B2 | 8/2012 | Smallwood |
| 8,341,006 B2 | 12/2012 | Lin et al. |
| 8,364,559 B1 | 1/2013 | Bhosle et al. |
| 8,374,936 B2 | 2/2013 | Fuentes-Torres |
| 8,458,016 B1 | 6/2013 | Medina, III et al. |
| 8,484,142 B2 | 7/2013 | Pinckney et al. |
| 8,489,497 B1 | 7/2013 | Novak et al. |
| 8,494,978 B2 | 7/2013 | Pinckney et al. |
| 8,572,020 B2 | 10/2013 | Tuzhilin et al. |
| 8,583,511 B2 | 11/2013 | Hendrickson |
| 8,619,984 B2 | 12/2013 | McSherry et al. |
| 8,666,909 B2 | 3/2014 | Pinckney et al. |
| 8,694,456 B2 | 4/2014 | Grigg et al. |
| 8,719,085 B2 | 5/2014 | Sullivan |
| 8,738,486 B2 | 5/2014 | McGeehan |
| 8,751,427 B1* | 6/2014 | Mysen .................. H04L 67/306 706/46 |
| 9,009,088 B2 | 4/2015 | Wilson et al. |
| 9,009,096 B2 | 4/2015 | Pinckney et al. |
| 9,069,934 B1 | 6/2015 | Meeboer et al. |
| 9,805,389 B2 | 10/2017 | Radziwonczyk-Syta et al. |
| 10,438,269 B2 | 10/2019 | Merz et al. |
| 2001/0039519 A1 | 11/2001 | Richards |
| 2002/0091535 A1 | 7/2002 | Kendall et al. |
| 2002/0147619 A1 | 10/2002 | Floss et al. |
| 2002/0161664 A1 | 10/2002 | Shaya et al. |
| 2002/0166060 A1 | 11/2002 | Hsieh et al. |
| 2003/0009368 A1 | 1/2003 | Kitts |
| 2003/0037041 A1 | 2/2003 | Hertz et al. |
| 2003/0216960 A1 | 11/2003 | Postrel |
| 2004/0225509 A1 | 11/2004 | Andre |
| 2005/0251440 A1 | 11/2005 | Bednarek |
| 2006/0043164 A1 | 3/2006 | Dowling et al. |
| 2006/0143072 A1 | 6/2006 | Herman et al. |
| 2006/0259364 A1 | 11/2006 | Strock et al. |
| 2007/0038515 A1 | 2/2007 | Postrel |
| 2007/0100773 A1 | 5/2007 | Wallach |
| 2007/0143172 A1 | 6/2007 | Bhagchandani et al. |
| 2007/0244741 A1* | 10/2007 | Blume ................ G06Q 30/0255 705/7.31 |
| 2008/0040201 A1 | 2/2008 | Hedlund et al. |
| 2008/0167887 A1 | 7/2008 | Marcken |
| 2008/0201271 A1 | 8/2008 | Davis et al. |
| 2008/0243531 A1 | 10/2008 | Hyder et al. |
| 2008/0249987 A1 | 10/2008 | Ogasawara |
| 2009/0048884 A1 | 2/2009 | Olives et al. |
| 2009/0063304 A1 | 3/2009 | Meggs |
| 2009/0125498 A1* | 5/2009 | Cao ...................... G06F 16/951 |
| 2009/0171759 A1 | 7/2009 | McGeehan |
| 2009/0182568 A1 | 7/2009 | Cordeiro |
| 2009/0192875 A1 | 7/2009 | Bene et al. |
| 2009/0192876 A1 | 7/2009 | De et al. |
| 2009/0198557 A1 | 8/2009 | Wang et al. |
| 2009/0254463 A1 | 10/2009 | Tomchek et al. |
| 2009/0254971 A1 | 10/2009 | Herz et al. |
| 2009/0271246 A1 | 10/2009 | Alvarez et al. |
| 2009/0281875 A1 | 11/2009 | Tarka |
| 2009/0307060 A1 | 12/2009 | Merz et al. |
| 2009/0319423 A1 | 12/2009 | Kersenbrock |
| 2010/0023374 A1 | 1/2010 | Berwitz et al. |
| 2010/0211458 A1 | 8/2010 | Ramer et al. |
| 2010/0256982 A1 | 10/2010 | Bhagchandani et al. |
| 2010/0280880 A1 | 11/2010 | Faith et al. |
| 2010/0301114 A1 | 12/2010 | Lo Faro et al. |
| 2010/0312724 A1 | 12/2010 | Pinckney et al. |
| 2011/0022606 A1* | 1/2011 | Mason .................. G06Q 30/02 707/748 |
| 2011/0035279 A1 | 2/2011 | Herman et al. |
| 2011/0066507 A1 | 3/2011 | Iyer et al. |
| 2011/0068170 A1 | 3/2011 | Lehman |
| 2011/0077951 A1 | 3/2011 | Tullis |
| 2011/0078010 A1 | 3/2011 | Postrel |
| 2011/0078021 A1 | 3/2011 | Tullis |
| 2011/0093324 A1 | 4/2011 | Fordyce, III et al. |
| 2011/0246537 A1 | 10/2011 | Labbi et al. |
| 2011/0307478 A1 | 12/2011 | Pinckney et al. |
| 2012/0109749 A1* | 5/2012 | Subramanian ..... G06Q 30/0255 705/14.53 |
| 2012/0123674 A1 | 5/2012 | Perks et al. |
| 2012/0226551 A1 | 9/2012 | Bhagchandani et al. |
| 2012/0232968 A1 | 9/2012 | Calman et al. |
| 2012/0245991 A1 | 9/2012 | Herman et al. |
| 2012/0253998 A1 | 10/2012 | Toyama |
| 2012/0271717 A1 | 10/2012 | Postrel |
| 2012/0296724 A1 | 11/2012 | Faro et al. |
| 2012/0303569 A1 | 11/2012 | Tuzhilin et al. |
| 2012/0303676 A1 | 11/2012 | Tuzhilin et al. |
| 2012/0324059 A1 | 12/2012 | Tuzhilin et al. |
| 2013/0024313 A1 | 1/2013 | Dayal et al. |
| 2013/0030925 A1 | 1/2013 | Caiman et al. |
| 2013/0046626 A1 | 2/2013 | Grigg et al. |
| 2013/0075469 A1 | 3/2013 | Stochita |
| 2013/0085804 A1* | 4/2013 | Left .................... G06Q 30/0219 705/7.29 |
| 2013/0124263 A1 | 5/2013 | Amaro et al. |
| 2013/0124449 A1 | 5/2013 | Pinckney et al. |
| 2013/0132283 A1 | 5/2013 | Hayhow et al. |
| 2013/0179246 A1 | 7/2013 | Ross |
| 2013/0246125 A1 | 9/2013 | DiGioacchino et al. |
| 2013/0246146 A1 | 9/2013 | Fischer et al. |
| 2013/0246176 A1 | 9/2013 | Chang et al. |
| 2013/0246178 A1 | 9/2013 | Fischer et al. |
| 2013/0264385 A1 | 10/2013 | Stoudt et al. |
| 2013/0275181 A1 | 10/2013 | DiGioacchino et al. |
| 2013/0275417 A1 | 10/2013 | Fernandes |
| 2013/0304691 A1 | 11/2013 | Pinckney et al. |
| 2013/0346152 A1 | 12/2013 | Rahman et al. |
| 2013/0346221 A1* | 12/2013 | Rangachari ........ G06Q 30/0277 705/14.73 |
| 2014/0067596 A1 | 3/2014 | McGovern et al. |
| 2014/0108320 A1 | 4/2014 | Baca et al. |
| 2014/0122228 A1 | 5/2014 | Wical |
| 2014/0129372 A1 | 5/2014 | Kalnsay |
| 2014/0164057 A1 | 6/2014 | Wen et al. |
| 2014/0180979 A1 | 6/2014 | Pinckney et al. |
| 2014/0297457 A1 | 10/2014 | Sapugay et al. |
| 2014/0297458 A1 | 10/2014 | Sapugay et al. |
| 2014/0372338 A1 | 12/2014 | Kim et al. |
| 2015/0032602 A1 | 1/2015 | Blackhurst et al. |
| 2015/0066632 A1 | 3/2015 | Gonzalez et al. |
| 2015/0066691 A1 | 3/2015 | Ready et al. |
| 2015/0066721 A1 | 3/2015 | Mandelli et al. |

(56) References Cited

U.S. PATENT DOCUMENTS

| | | | |
|---|---|---|---|
| 2015/0331866 A1* | 11/2015 | Shen | G06F 16/24578 707/723 |
| 2015/0379609 A1 | 12/2015 | Sedhain et al. | |
| 2017/0061452 A1 | 3/2017 | Mukherjee et al. | |

FOREIGN PATENT DOCUMENTS

| | | |
|---|---|---|
| KR | 2010004394 A | 1/2010 |
| KR | 2012076477 A | 7/2012 |
| WO | 2012119122 A1 | 9/2012 |

OTHER PUBLICATIONS

Jackson, Joab. Startup draws restaurant recommendations by analyzing credit card transactions. Mar. 25, 2011. Published by Computerworld. Accessed via https://www.computerworld.com/article/2507284/startup-draws-restaurant-recommendations-by-analyzing-credit-card-transactions.html (Year: 2011).*

Wikipedia, Location-based service, Internet Article, May 16, 2011 (May 16, 2011), XP055187300 Retrieved from the Internet: URL:http://en.wikipedia.org/w/index.php?title=Location-based service&oldid=529423127 [retrieved on May 4, 2015].

Wikipedia: "Interbank network", Internet Article, Feb. 16, 2011 (Feb. 16, 2011), XP055135992, Retrieved from the Internet: URL:http://en.wikipedia.org/w/indexphp?title=Interbank network&oldid=514221461 [retrieved on Aug. 22, 2014].

L. L., N. M., & D. X. (2011). Multi-Criteria Service Recommendation Based on User Criteria Preferences. In RecSys 11, Proceedings of the fifth ACM conference on Recommender systems (pp. 77-84). New York, NY: ACM. (Year: 2011).

EPO Extended Search Report, Application No. 13878016.8 (PCT/US2013077843), dated Jun. 29, 2016, 9 pp.

Extended EP Search Report, dated Sep. 12, 2014, for EP patent application No. EP 12789273.5 (9 pgs).

European Office Action, European Application No. 12789273.5, dated May 8, 2015, pp. 9.

International Search Report and Written Opinion dated Aug. 3, 2012, PCT Application No. PCT/US2012/038515 (12 pages).

Janssen, Jan-Keno, "Wo bist'n du?—Google Geodienst Latitude", c't Mar. 2011, Jan. 17, 2011 (Jan. 17, 2011), pp. 36-88, XP055205403, Retrieved from the Internet: URL: http://www.heise.de/artikel-archiv/ct/2011/03/086/@00250@/ct.11.03.086-088.pdf [retrieved on Jul. 30, 2015].

PCT International Search Report and Written Opinion for related matter PCT/US2013/077843 dated Apr. 21, 2014; 12 pp.

PCT Search Report and Written Opinion, Application No. PCT/US2016/042219, dated Nov. 1, 2016, 8 pps.

Tanenbaum, Andrew S., et al: "Distributed Systems: Principles and Paradigms (2nd Edition)", Oct. 12, 2006 (Oct. 12, 2006), Prentice Hall, XP055164378,ISBN: 978-0-13-239227-3 pp. 0-68.

Wikipedia: "GUI widget", Internet Article, Mar. 12, 2011 (Mar. 12, 2011), XP055102475,Retrieved from the Internet:URL:http://en.wikipedia.org/w/index. php?title=GUI_widget&oldid=418442999 [retrieved on Feb. 17, 2014].

Wikipedia: "Mobile Web", Internet Article, May 18, 2011 (May 18, 2011), XP055265611,Retrieved from the Internet:URL:https://en.wikipedia.org/w/index.php?title=Mobile_Web&oldid=429782573 [retrieved on Apr. 14, 2016].

* cited by examiner

SYSTEM, METHOD, AND NON-TRANSITORY COMPUTER-READABLE STORAGE MEDIA FOR RECOMMENDING MERCHANTS

CROSS REFERENCE TO RELATED APPLICATIONS

This application is a continuation of and claims priority to U.S. patent application Ser. No. 13/797,400 filed on Mar. 12, 2013, entitled "SYSTEMS AND METHODS FOR RECOMMENDING MERCHANTS", which is hereby incorporated herein by reference in its entirety.

BACKGROUND OF THE DISCLOSURE

The field of the disclosure relates generally to methods and systems for recommending merchants and, more particularly, to methods and systems for recommending merchants to a transaction payment cardholder based at least in part on the cardholder's past transaction history and the cardholder's merchant preferences.

Consumers today are provided with an increasing number of segments of entertainment choices available, as well as, an increasing number of merchants available in each segment. A segment is a group of merchants offering a similar entertainment experience, such as a dining segment, an events segment, a night club segment, and an activities segment. For example, in many cities, consumers have hundreds if not thousands of restaurant options when they desire to eat. Moreover, even when the restaurant options are narrowed by restaurant category or cuisine, there may still be an inconveniently large number of restaurant options presented to the consumer. Additionally, new restaurants may become available without the consumer's knowledge.

To address these issues, various known methods exist that provide restaurant recommendations to consumers. For example, Internet websites exist that enable consumers to provide restaurant reviews or score the restaurant, as well as, provide descriptive information (e.g., average prices, type of cuisine) about the restaurant. Often times, consumers can provide their comments and information for a restaurant in addition to a professional reviewer, thereby providing additional opinions for consumers. One problem that arises with relying on reviews of other consumers when selecting a restaurant is that some consumers have different preferences than other consumers, which can make the reviews and/or score for a restaurant unreliable for certain consumers. Additionally, in some instances, consumers are more likely to post a review based on a bad experience at a restaurant than they are to post a positive review, which can bias recommendations for other consumers.

Moreover, merchants may want to aid a consumer's decision by offering incentives, such as reward points, discounts, and special offers to consumers. Consumers have the option of searching numerous websites or "friending" numerous merchants in an effort to make more informed entertainment decisions. However, the websites are often not objective and their reputations are often not objective, and friending numerous merchant results in time-consuming searching through the friended merchant's website.

BRIEF DESCRIPTION OF THE DISCLOSURE

In one embodiment, a computer system for recommending merchants to a candidate cardholder is provided. The computer system includes a memory device in communication with a processor. The processor is programmed to receive transaction information for a plurality of cardholders from a payment network. The transaction information includes data relating to purchases made by the cardholders at a plurality of merchants. The purchases satisfying a first criteria. The processor receives candidate cardholder preference information for at least one of the merchants input by the candidate cardholder. The computer system determines a merchant rank for each merchant based on the received transaction information and the candidate cardholder preference information, and determines a neutral merchant rank for each merchant based on the received transaction information and neutral cardholder preferences of the plurality of cardholders. The computer system then determines a merchant score for each of the plurality of merchants by comparing the merchant rank to the neutral merchant rank.

In another embodiment, a computer-implemented method is provided for recommending at least one merchant of a plurality of merchants to a candidate cardholder using a merchant analytic (MA) computer system. The MA computer system is in communication with a memory device. The method includes receiving transaction information for a plurality of cardholders including the candidate cardholder from a payment network. The transaction information includes data relating to purchases made by the cardholders at the plurality of merchants, wherein the purchases satisfy during a predetermined time period and within a predetermined geographical region. The method also includes receiving candidate cardholder preference information for at least one of the plurality of merchants, wherein the candidate cardholder preference information is input by the candidate cardholder using a cardholder computing device. The method determines a merchant rank for each merchant based on the received transaction information and the candidate cardholder preference information, and determines a neutral merchant rank for each merchant based on the received transaction information and neutral cardholder preferences associated with the cardholders. The method uses the MA computer system to determine a merchant score for each merchant by comparing the merchant rank to the neutral merchant rank.

In yet another embodiment, one or more computer-readable storage media provided that include computer-executable instructions embodied thereon for recommending at least one merchant of a plurality of merchants to a candidate cardholder. When executed by at least one processor, the computer-executable instructions cause the processor to receive transaction information for a plurality of cardholders including the candidate cardholder from a payment network. The transaction information includes data relating to purchases made by the cardholders at a plurality of merchants. The purchases satisfy a first criteria. The processor receives candidate cardholder preference information for at least one of the plurality of merchants. The processor also determines a merchant rank for each merchant based on the received transaction information and the candidate cardholder preference information. The processor further determines a neutral merchant rank for each merchant based on the received transaction information and neutral cardholder preferences associated with the cardholders. The processor determines a merchant score for each of the plurality of merchants by comparing the merchant rank to the neutral merchant rank.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example merchant analytic computer system including a plurality of computer devices including a user device having a merchant recommender application in accordance with one example embodiment of the present invention.

FIG. 3 is an expanded block diagram of an example embodiment of a server architecture of the merchant analytic computer system including the plurality of computer devices in accordance with one example embodiment of the present invention.

FIG. 4 illustrates an example configuration of a client system shown in FIGS. 2 and 3.

FIG. 5 illustrates an example configuration of a server system shown in FIGS. 2 and 3.

FIG. 6 is a block diagram showing an operation of the merchant analytic computer system shown in FIG. 2.

FIG. 7 is a flow diagram of an example method of recommending merchants to a candidate cardholder using the merchant analytic computer system shown in FIG. 2 coupled to a user device having a merchant recommender application stored thereon.

FIG. 8 is a block diagram showing the process by which the merchant analytic computer system creates a matrix of merchant associations.

FIG. 9 is a screen shot of an initial screen of the merchant recommender application shown in FIG. 2 that may be used by a cardholder to interface with the merchant analytic computer system shown in FIG. 2.

FIG. 10 is a screen shot displayed within the merchant recommender application shown in FIG. 2 showing a filter screen that may be used by a cardholder to interface with the merchant analytic computer system shown in FIG. 2.

FIG. 11 is a screen shot displayed within the merchant recommender application shown in FIG. 2 showing a filter manually screen that may be used by a cardholder to interface with the merchant analytic computer system shown in FIG. 2.

FIG. 12 is a screen shot displayed within the merchant recommender application shown in FIG. 2 showing a list of recommended merchants generated by the merchant analytic computer system shown in FIG. 2.

FIG. 13 is a screen shot displayed within the merchant recommender application shown in FIG. 2 showing a merchant detail screen.

FIG. 14 is a screen shot of a merchant portal that interfaces between a merchant using a client system and the merchant analytic computer system both shown in FIG. 2.

FIG. 15 is a screen shot of a customer details tab of the merchant portal shown in FIG. 14.

FIG. 16 is a screen shot of a loyalty tab of the merchant portal shown in FIG. 14.

FIG. 17 is a screen shot of an offers tab of the merchant portal shown in FIG. 14.

DETAILED DESCRIPTION OF THE DISCLOSURE

Figure 1:
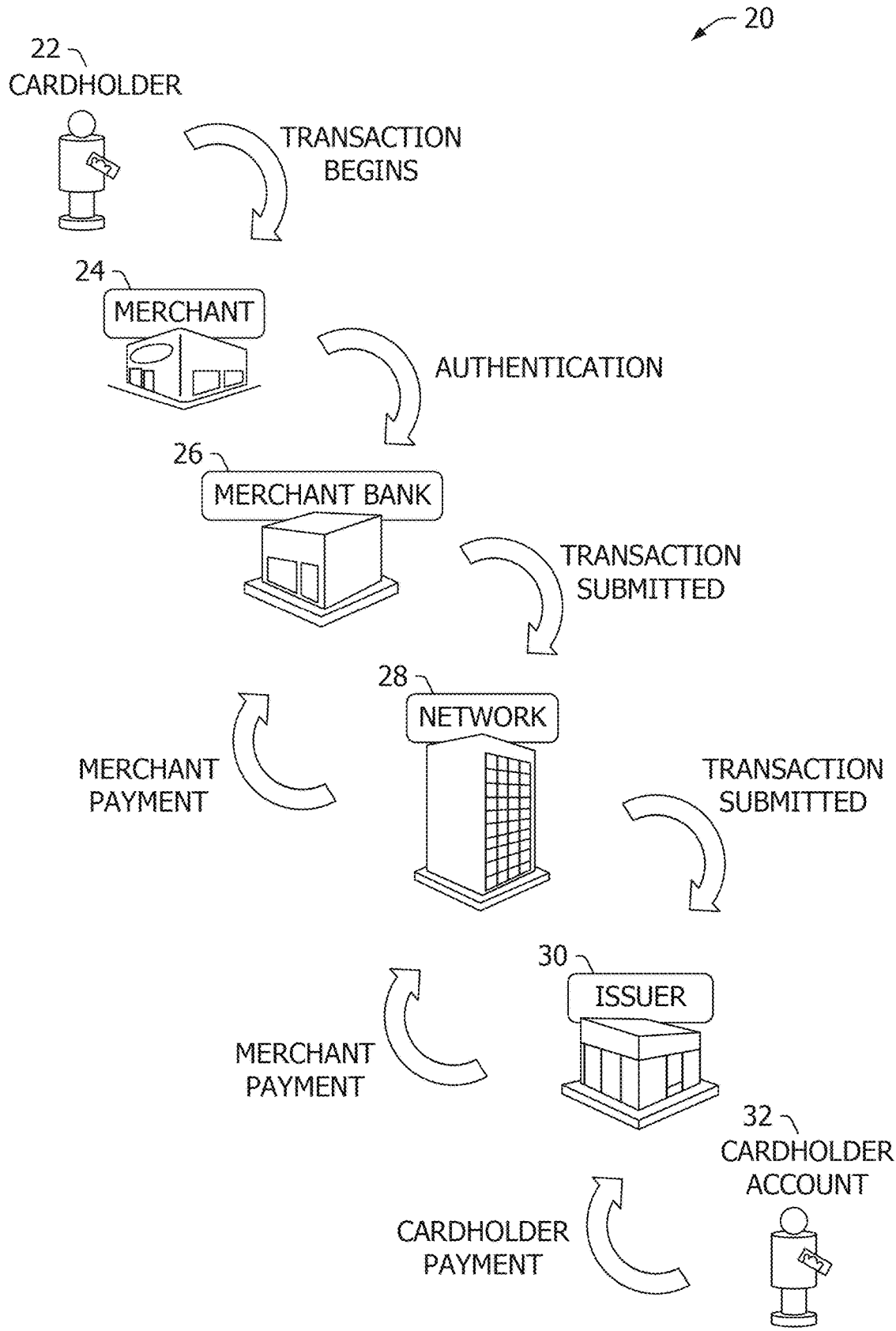
FIGS. 1-17 show exemplary embodiments of the methods and systems described herein.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for providing cardholders objective and reputable information for making entertainment decisions among numerous available merchants. More specifically, the disclosure describes a merchant analytic computer system (also referred to as "MA computer system") configured to collect transaction data associated with a payment cardholder, apply cardholder preferences, and recommend at least one merchant to the cardholder that the cardholder may be interested in transacting business with. The MA computer system is in communication with a user device having a merchant recommender application (also referred to as "recommender app") stored thereon such that a user (e.g., a cardholder) can input preferences to be considered by the MA computer system, and view output from the MA computer system. The output includes recommendations for merchants that match or compare similarly to other merchants frequented by user.

The MA computer system is configured to recommend a merchant to a cardholder. In the example embodiment, the MA computer system is configured for use with a payment card processing network such as, for example, an interchange network. The MA computer system includes a memory device and a processor in communication with the memory device and is programmed to communicate with the payment network to receive transaction information for a plurality of cardholders. The payment network is configured to process payment card transactions between the merchant and its acquirer bank, and the cardholder and their issuer bank. Transaction information includes data relating to purchases made by cardholders at various merchants during a predetermined time period and within a predetermined geographical region. In some embodiments, the plurality of purchases made by the cardholders are related to each other as being in the same market segment, for example, but not limited to, a dining segment, an events segment, a night club segment, or an activities segment.

In the example embodiment, for cardholders that transact at two or more merchants of the plurality of merchants during the predetermined time period, the MA computer system creates a matrix of merchant associations for the plurality of merchants indicating the number of transactions between each merchant combination and the cardholders. For each cardholder that has transacted at multiple merchants within the specified segment, the MA computer system updates the association matrix with the transaction information. More specifically, a counter is associated with each merchant within the matrix. For each pair of merchants visited by each cardholder, the MA computer system increments the counter associated with those merchants. Accordingly, the more often a cardholder of the plurality of cardholders transacts with a merchant, the more associations that merchant will obtain within the matrix.

The MA computer system is also programmed to receive candidate cardholder preference information from a candidate cardholder included within the plurality of cardholders for one or more merchant of the plurality of merchants. Candidate cardholder preference information is inputted to the MA computer system by the candidate cardholder using a recommender application stored on a cardholder computing device, such as a Smartphone having a recommender app stored thereon. In one embodiment, candidate cardholder preference information is obtained by the MA computer system analyzing historical transaction data associated with the candidate cardholder for merchants transacted with. In another embodiment, the candidate cardholder manually selects at least one merchant within the recommender app. The list of merchants is generated by the MA computer system based on a geographical region selectable by the candidate cardholder. In another embodiment, the cardholder inputs "friends" associated with the cardholder on a social networking website and/or from experts subscribed to by the cardholder on a social networking website. In the example embodiment, candidate cardholder preference information may include results from surveys, Internet website scraping, solicited and unsolicited opinion data, satisfaction scale input, and/or other ranking acquisition methods. Moreover, candidate cardholder preference information may relate to an overall experience with a merchant.

Based on the candidate cardholder preference information, the MA computer system creates a candidate cardholder preference vector. The candidate cardholder preference vector represents a measurement of the candidate cardholder's preference for one merchant relative to at least one other merchant of the plurality of merchants. In one embodiment, cardholder merchant preferences are associated with a score for each merchant. For example, the preference may be measured on a scale of 1 to 10, or on a 5-star scale. In another embodiment, a value of one is associated with each merchant selected by the candidate cardholder from a list and aggregated. In a further embodiment, each merchant is associated with a magnitude based on a gratuity amount inferred from the historical transaction information. Regardless of the preference measurement chosen, in some embodiments, the MA computer system normalizes the candidate cardholder preference vector such that each merchant is given a value, and the values for the plurality of merchants sums to one, which provides a scaled candidate cardholder preference vector that is biased based on the candidate cardholder's merchant preferences.

In the example embodiment, the MA computer system applies the candidate cardholder preference vector to the matrix of merchant associations to determine a merchant ranking vector. The merchant ranking vector is associated with the candidate cardholder preference information and includes a merchant rank associated with each merchant of the plurality of merchants. The merchant rank represents a measure of general popularity of each merchant relative to the plurality of merchants that is adjusted according to the candidate cardholder preference information.

The MA computer system then creates and applies a neutral preference vector to the matrix of merchant associations to determine a neutral merchant ranking vector. The neutral preference vector includes generic preference information that is equal for each merchant of the plurality of merchants. The neutral merchant ranking vector includes a neutral merchant rank associated with each merchant of the plurality of merchants. The neutral merchant rank represents a measure of general popularity of each merchant relative to the plurality of merchants among the plurality of cardholders.

The MA computer system compares the neutral merchant ranking vector to the merchant ranking vector to determine a merchant score vector for the candidate cardholder. The merchant score vector includes a merchant score indicating the difference between the merchant rank and the neutral merchant rank associated with each merchant of the plurality of merchants. The merchant score represents a measure of recommendation for each merchant of the plurality of merchants determined by the MA computer system for the candidate cardholder.

In the example embodiment, the MA computer system sorts the merchant score vector in descending order based on the merchant score associated with each merchant of the plurality of merchants. More specifically, in the example embodiment, the merchant having the highest merchant score is placed first in the merchant score vector and the merchant having the lowest merchant score is placed last in the merchant score vector. The MA computer system then provides a list of recommended merchants to the candidate cardholder using the recommender app, wherein the list is based on the sorted merchant score vector.

A technical effect of the systems and methods described herein is achieved by performing at least one of the following steps: (a) receiving, by the MA computer system, transaction information for a plurality of cardholders from a payment network, wherein the transaction information includes data relating to purchases made by the plurality of cardholders at a plurality of merchants during a predetermined time period and within a predetermined geographical region (or some other criteria); (b) for cardholders that transact at two or more merchants of the plurality of merchants during the predetermined time period, creating a matrix of merchant associations for the plurality of merchants indicating the number of transactions between each merchant combination and the cardholders; (c) receiving, from a candidate cardholder included within the plurality of cardholders, candidate cardholder preference information for one or more merchants of the plurality of merchants, the candidate cardholder preference information inputted using a recommender app stored on a cardholder computing device; (d) based on the candidate cardholder preference information, creating a candidate cardholder preference vector representing a measurement of the candidate cardholder's preference for one merchant relative to at least one other merchant; (e) applying the candidate cardholder preference vector to the matrix of merchant associations to determine a merchant ranking vector, wherein the merchant ranking vector is associated with the candidate cardholder and includes a merchant rank associated with each merchant of the plurality of merchants; (f) applying a neutral preference vector to the matrix of merchant associations to determine a neutral merchant ranking vector, wherein the neutral preference vector includes generic preference information that is equal for each merchant of the plurality of merchants and wherein the neutral merchant ranking vector includes a neutral merchant rank associated with each merchant of the plurality of merchants; (g) comparing the neutral merchant ranking vector to the merchant ranking vector to determine a merchant score vector for the candidate cardholder, wherein the merchant score vector includes a merchant score indicating the difference between the merchant rank and the neutral merchant rank associated with each merchant of the plurality of merchants, and wherein the merchant score represents a level of recommendation determined for the candidate cardholder; (h) sorting the merchant score vector in descending order based on the merchant score associated with each merchant of the plurality of merchants; and (i) providing a list of recommended merchants to the candidate cardholder, wherein the list is based on the sorted merchant score vector.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an example multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

For debit card transactions, when a request for a personal identification number (PIN) authorization is approved by the issuer, cardholder's account 32 is decreased. Normally, a charge is posted immediately to cardholder's account 32. The payment card association then transmits the approval to the acquiring processor for distribution of goods/services or information, or cash in the case of an automated teller machine (ATM).

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
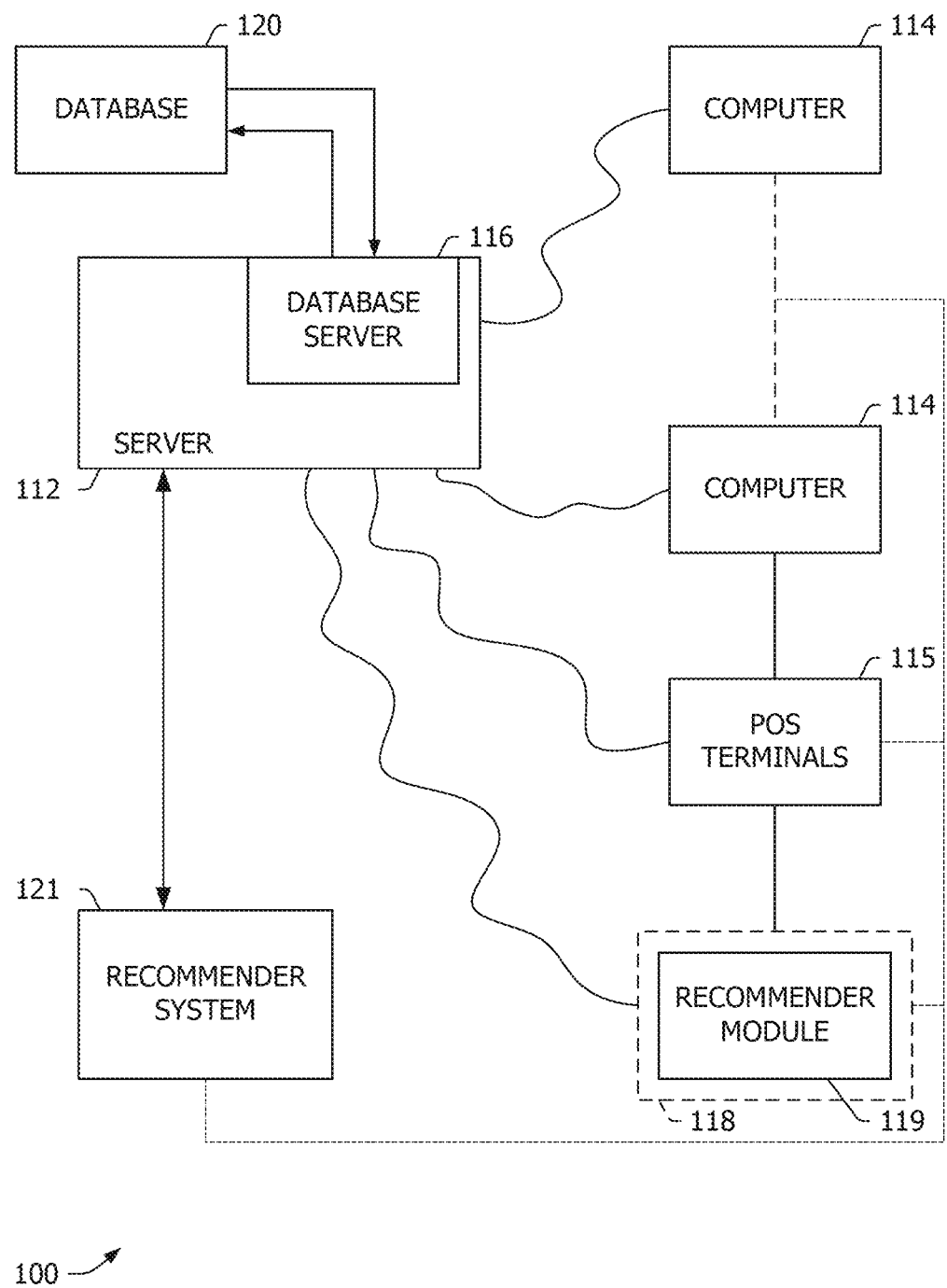

FIG. 2 is a simplified block diagram of an example processing system 100 including a plurality of computer devices including a user device having a merchant recommender application in accordance with one example embodiment of the present invention. In the example embodiment, system 100 may be used for performing payment-by-card transactions received as part of processing the financial transaction. In addition, system 100 is a payment processing system that includes a merchant analytic (MA) computer system 121 configured to provide merchant recommendation data to a computing device using a merchant recommender application 119 stored thereon. As described below in more detail, MA computer system 121 is configured to receive transaction data and cardholder preference information, and recommend a list of merchants to a particular cardholder via merchant recommender application 119 based on the received information.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet or some other network connection configured for processing payment card transactions. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 115, which may be connected to client systems 114 and may be connected to server system 112. POS terminals 115 are interconnected to the Internet through many interfaces including a network, such as a LAN or a WAN, dial-in-connections, cable modems, wireless modems, and special high-speed ISDN lines. POS terminals 115 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114 or by a merchant recommender application 119 stored on a cardholder computing device 118. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

System 100 also includes at least one cardholder computing device 118, which is configured to communicate with at least one of POS terminals 115, client systems 114 and server system 112. In the example embodiment, cardholder computing device 118 is associated with or controlled by a cardholder making a purchase using system 100. Cardholder computing device 118 is interconnected to the Internet through many interfaces including a network, such as a LAN or WAN, dial-in-connections, cable modems, wireless modems, and special high-speed ISDN lines. Cardholder computing device 118 may be any device capable of interconnecting to the Internet including a web-based phone, smartphone, PDA, iPhone® (iPhone is a registered trademark of Apple, Incorporated located in Cupertino, Calif.), Android® device (Android is a registered trademark of Google Incorporated located in Mountain View, Calif.), and/or any device capable of executing stored computer-readable instructions. Cardholder computing device 118 is configured to communicate with POS terminals 115 using various outputs including, for example, Bluetooth communication, radio frequency communication, near field communication, network-based communication, and the like.

In the example embodiment, cardholder computing device 118 includes merchant recommender application 119, or recommender app 119. Recommender app 119 interfaces between a cardholder using cardholder computing device 118 and MA computer system 121. More specifically, recommender app 119 receives and transmits cardholder transaction information and cardholder preference information input by the cardholder to MA computer system 121 either directly or through server 112. Transaction information may include a payment card number, an account number and/or any other data relating to purchases made by a cardholder.

In the example embodiment, cardholder computing device 118 may initiate a transaction by transmitting payment card data to merchant POS device 115 or a cardholder can initiate a transaction by swiping a payment card at POS device 115. The transaction can then be processed, and settled, in a typical multi-party payment card industry system, e.g., system 20 (shown in FIG. 1). As described below, transaction data can then be transmitted to cardholder device 118 and displayed along with merchant recommendations through recommender app 119.

In the example embodiment, one of client systems 114 may be associated with acquirer bank 26 (shown in FIG. 1) while another one of client systems 114 may be associated with issuer bank 30 (shown in FIG. 1). POS terminal 115 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS terminal 115 may include a computer system associated with at least one of an online bank, a bill payment outsourcer, an acquirer bank, an acquirer processor, an issuer bank associated with a transaction card, an issuer processor, a remote payment system, and/or a biller. Further, in the example embodiment, MA computer system 121 is included in or is in communication with server system 112. In various embodiments, MA computer system 121 may be associated with a standalone processor or may be associated with a separate third party provider in a contractual relationship with interchange network 28 and configured to perform the functions described herein. Accordingly, each party involved in processing transaction data are associated with a computer system shown in system 100 such that the parties can communicate with one another as described herein.

Figure 3:
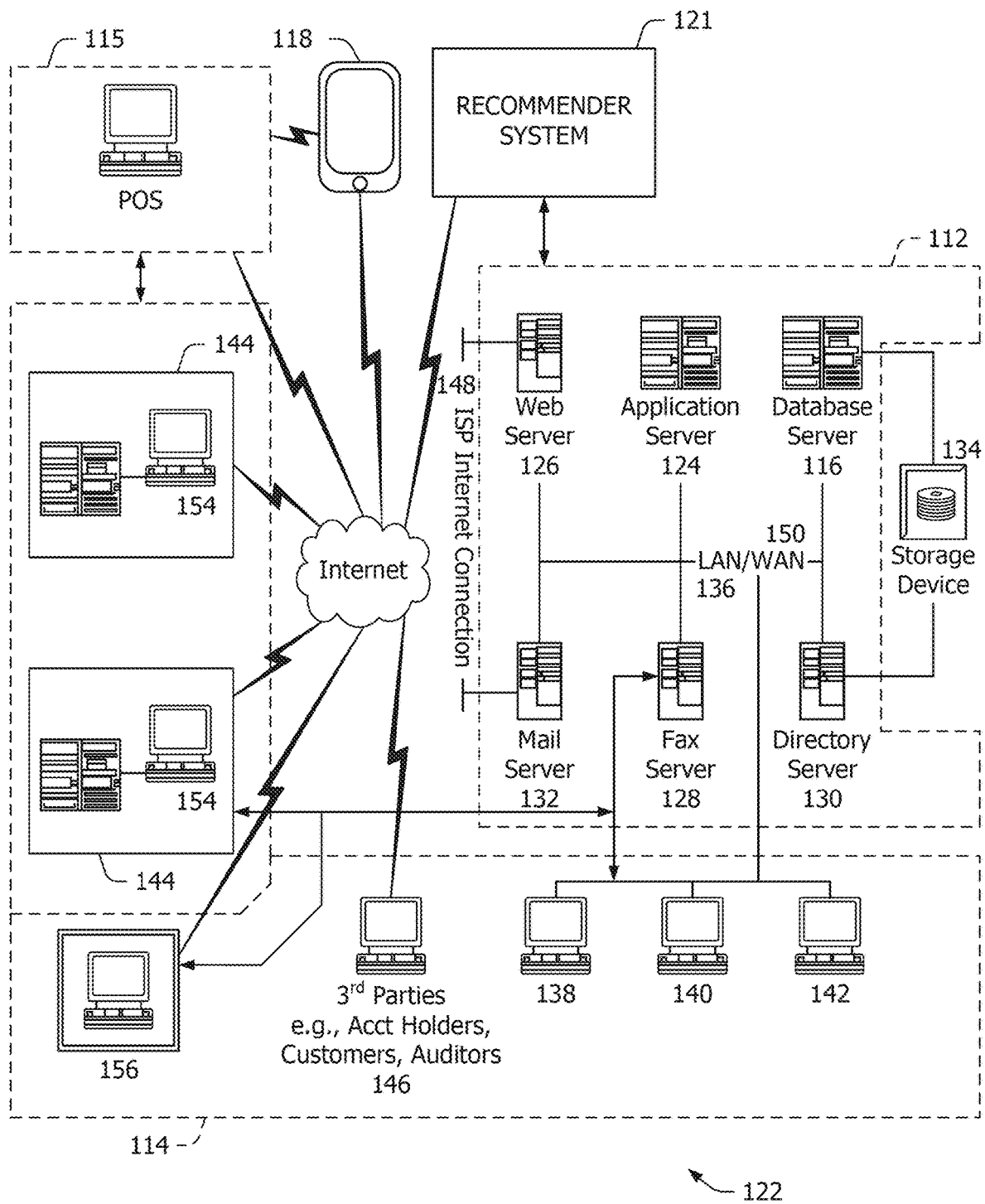

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 115. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a LAN 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other WAN type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

In the example embodiment, MA computer system 121 is in communication with server system 112 and is in wireless communication with client systems 114, POS terminals 115, and/or cardholder computing device 118. Moreover, in the example embodiment, cardholder computing device 118 is in wireless communication with POS terminals 115 or, alternatively, may be in wireless communication with server system 112 or client systems 114 and other workstations through a network connection.

Figure 4:
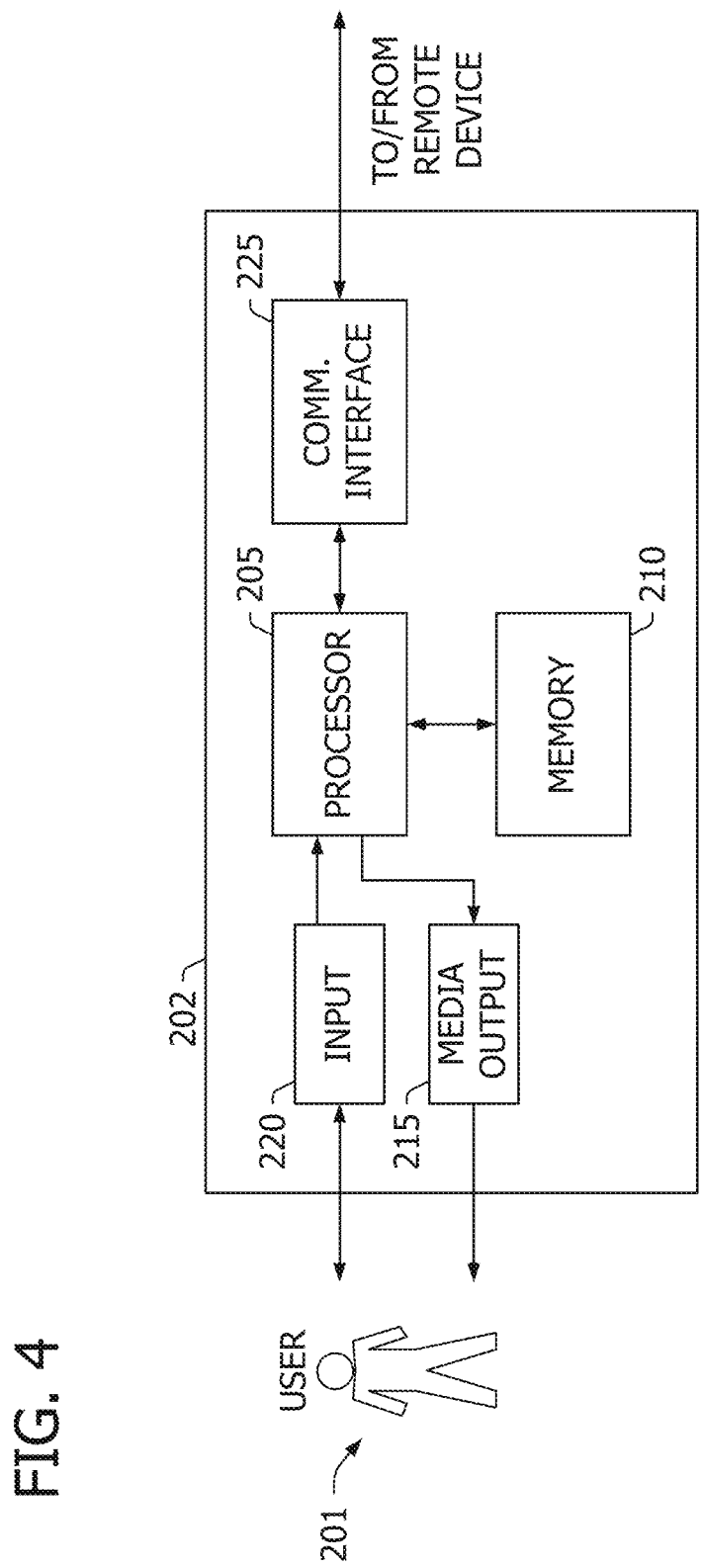

FIG. 4 illustrates an example configuration of a user system 202 operated by a user 201, such as cardholder 22 (shown in FIG. 1). User system 202 may include, but is not limited to, client systems 114, 138, 140, and 142, POS terminal 115, user device 118 including recommender app 119 (shown in FIG. 2), workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively countable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
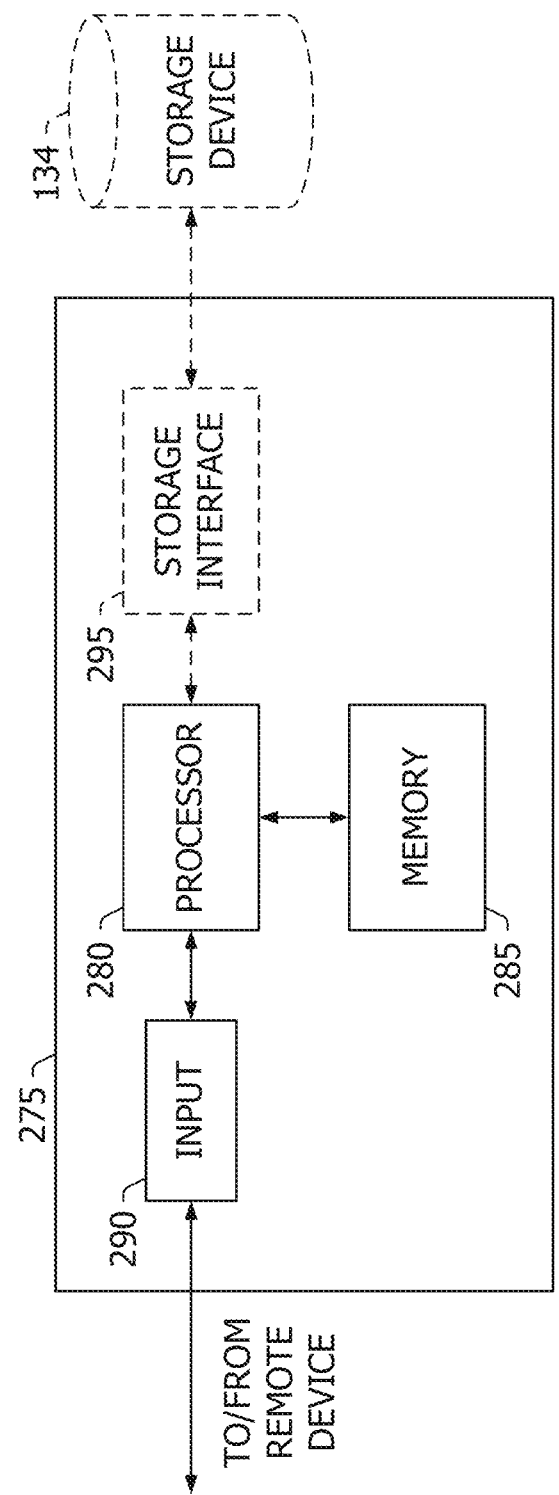

FIG. 5 illustrates an exemplary configuration of a server system 275 such as server system 112 (shown in FIGS. 2 and 3). Server system 275 may include, but is not limited to, database server 116, application server 124, web server 126, fax server 128, directory server 130, and mail server 132.

Server system 275 includes a processor 280 for executing instructions. Instructions may be stored in a memory area 285, for example. Processor 280 may include one or more processing units (e.g., in a multi-core configuration) for executing instructions. The instructions may be executed within a variety of different operating systems on the server system 275, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 280 is operatively coupled to a communication interface 290 such that server system 275 is capable of communicating with a remote device such as a user system or another server system 275. For example, communication interface 290 may receive requests from client system 114 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server system 275. For example, server system 275 may include one or more hard disk drives as storage device 134. In other embodiments, storage device 134 is external to system 275 and may be accessed by a plurality of server systems 275. For example, storage device 134 may include multiple storage units such as hard disk drives or solid state drives in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory area 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
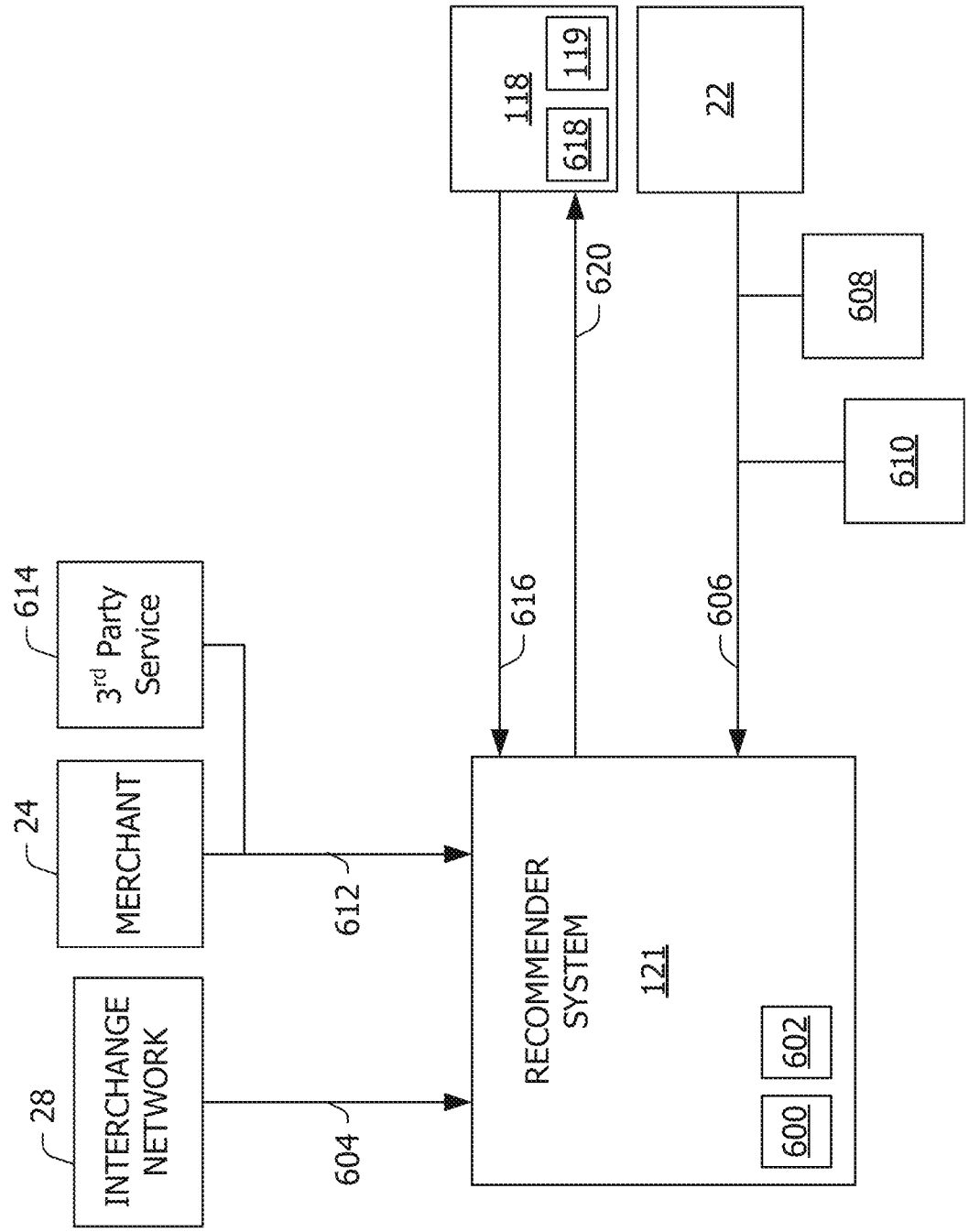

FIG. 6 is a block diagram showing operation of MA computer system 121 (shown in FIG. 2). MA computer system 121 is configured receive transaction data for a plurality of cardholders transacting with a plurality of merchants, receive cardholder preferences, and output a list of merchants recommended by MA computer system 121 based on the received data. In the example embodiment, MA computer system 121 is in communication with a payment network, such as payment card interchange network 28 (shown in FIG. 1), for receiving transaction data. MA computer system 121 includes a memory device 600 and a processor 602 in communication with memory device 600.

In the example embodiment, MA computer system 121 is programmed to communicate with payment network 28 to receive transaction information 604 for a plurality of payment cardholders. Payment network 28 is configured to process payment card transactions between merchants 24 associated with merchant banks 26, and cardholders 22 associated with issuer banks 30. Payment card transaction information 604 includes data relating to purchases made by a plurality of cardholders 22 at a plurality of merchants 24 during a predetermined time period and within a predetermined geographical region or some other criteria applied to the data. In some embodiments, the plurality of purchases made by cardholder 22 are related to each other as being in the same market segment, for example, but not limited to a dining segment, an events segment, a night club segment, or an activities segment. The dining segment may include all purchases made at restaurants and food service merchants. The events segment may include all purchases that relate to concerts, sporting, or cultural events. The night club segment may include dance clubs and casinos. The activities segment may include amusement parks, and attractions.

MA computer system 121 is also programmed to receive candidate cardholder preference information 606. Candidate cardholder preference information 606 may be received by: (i) MA computer system 121 analyzing historical transaction information for candidate cardholder 22; (ii) manual input from cardholder 22; (iii) extract preference information from "friends" 608 of cardholder 22 on a social networking website; and/or (iv) extract preference information from experts 610 subscribed to by cardholder 22 on a social networking website. Candidate cardholder preference information 606 may further include results from surveys, Internet website scraping, solicited and unsolicited opinion data, satisfaction scale input, and/or other ranking acquisition methods. Moreover, candidate cardholder preference information 606 may relate to an overall experience with merchants 24, or may include information relating to any aspect of an experience with merchant 24.

MA computer system 121 is further programmed to receive merchant descriptive information 612 from merchant 24 or from a third party service 614. Merchant descriptive information 612 includes information relating to location, hours of operation, upcoming events, entertainment provided, and advertising and promotional information. Merchant descriptive information 612 is stored in database 120 (shown in FIG. 2) associated with interchange network 28.

In the example embodiment, MA computer system 121 is also programmed to determine location information for each of the plurality of merchants relative to a predetermined selectable location and/or a current location 616 of cardholder 22. For example, a cardholder that uses cardholder computing device 118 (shown in FIG. 2) having a GPS capability 618 can use the determined location information to order a listing of merchants by distance from a current location of cardholder 22 or a location chosen by cardholder 22, for example, a hotel in a distant city where cardholder 22 will be staying during an upcoming trip.

In the example embodiment, MA computer system 121 is also programmed to determine a merchant score for each of the plurality of merchants 24 using the received transaction information 604 and the received cardholder preference information 606. The merchant score indicates a difference between a merchant rank and a neutral merchant rank associated with each merchant of the plurality of merchants, as will be described in more detail herein. The merchant score represents a level of recommendation (e.g., on a scale from 1 to 100 with 100 being the most recommended merchant for that particular cardholder) determined for a particular cardholder 22. In an alternate embodiment, MA computer system 121 is programmed to determine merchant scores for the plurality of merchants using at least one manually selected merchant 24 selected by candidate cardholder 22 from a list of the plurality of merchants 24. After determining the merchant scores of merchants 24, MA computer system 121 sorts the plurality of merchants 24 in descending order based on the merchant scores and provides a list 620 of recommended merchants to cardholder computing device 118, where it is displayed to candidate cardholder 22 via recommender app 119, as is described in further detail herein. Where the MA computer system 121 outputs a list of recommended merchants, it does so by taking into account a particular cardholder's preferences. As used herein, this particular cardholder may be referred to as a "candidate cardholder".

Figure 7:
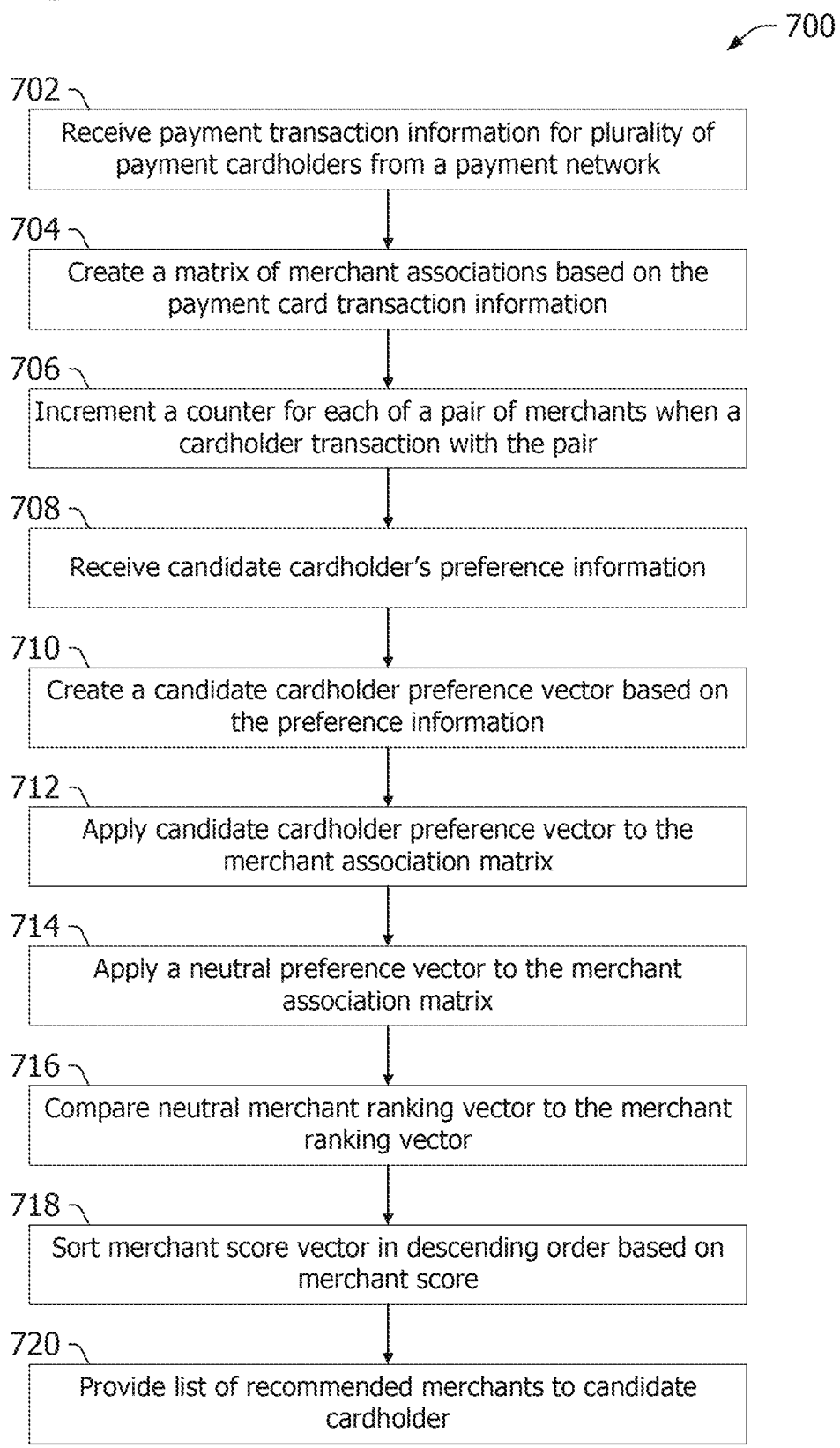

FIG. 7 is a flow diagram of an example method 700 of recommending at least one merchant of a plurality of merchants to a candidate cardholder using a computer device coupled to a database. In the example embodiment, method 700 may be implemented by MA computer system 121 (shown in FIG. 2).

In the example embodiment, the MA computer system receives 702 transaction information for a plurality of payment cardholders from a payment network. The payment network is configured to process payment card transactions between a merchant and a cardholder. The transaction information includes data relating to purchases made by a plurality of cardholders at a plurality of merchants during a predetermined time period and within a predetermined geographical region. In some embodiments, the purchases made by the plurality of cardholders are related to each other as being in the same market segment, for example, but not limited to a dining segment, an events segment, a night club segment, or an activities segment.

In the example embodiment, for cardholders that transact at two or more merchants of the plurality of merchants, the MA computer system creates 704 a matrix of merchant associations for the plurality of merchants indicating the number of transactions between each merchant combination and the cardholders. For each cardholder that has transacted at multiple merchants within the specified segment, the MA computer system updates the association matrix with the transaction information. More specifically, a counter is associated with each merchant within the matrix. For each pair of merchants visited by each cardholder, the MA computer system increments 706 the counter associated with those merchants. Accordingly, the more often a cardholder of the plurality of cardholders transacts with a merchant, the more associations that merchant will obtain within the matrix.

Figure 8:
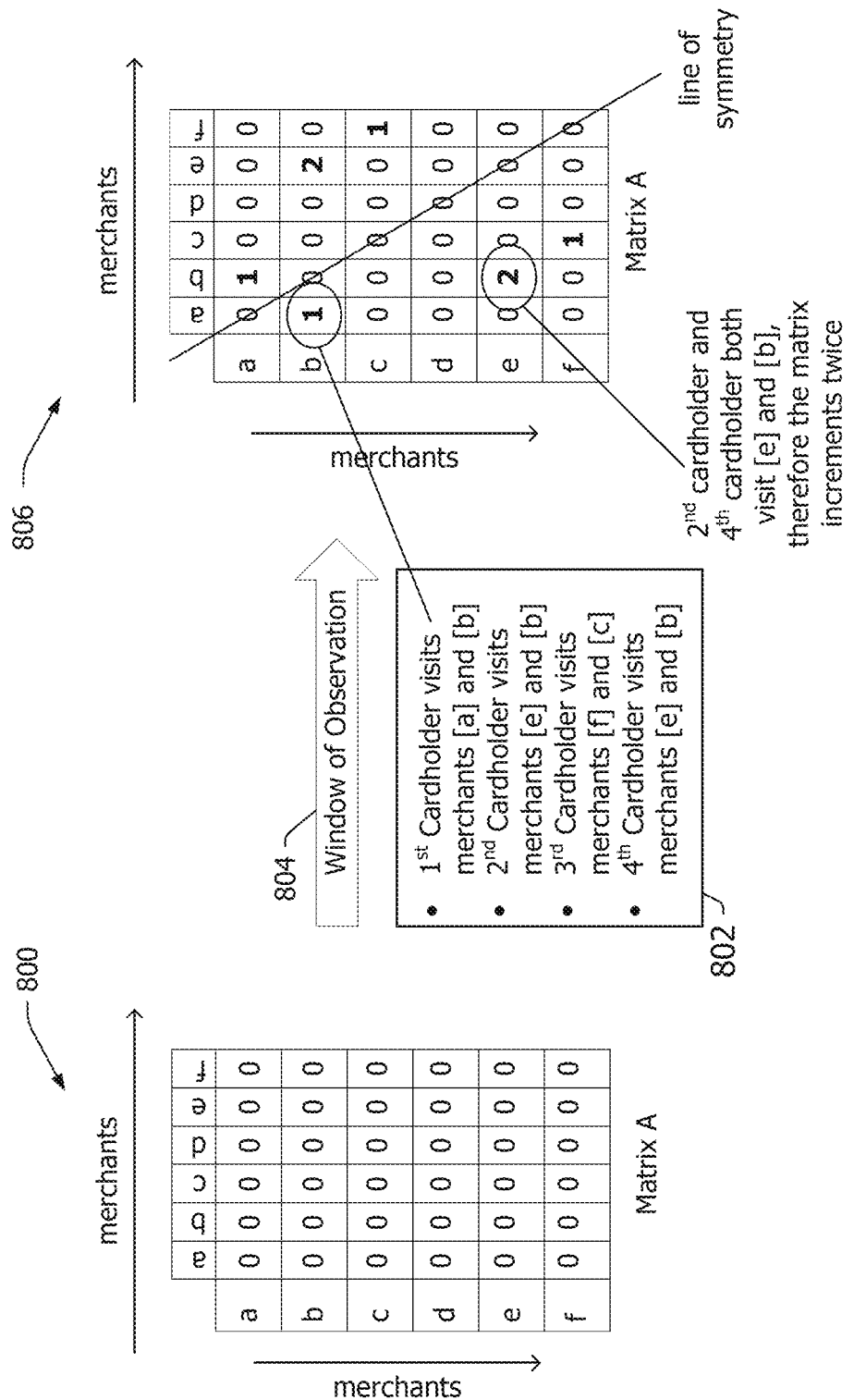

For example, FIG. 8 is a block diagram showing the process by which the MA computer system creates a matrix of merchant associations. Initially, the MA computer system determines which merchants associated with a specified segment are located within a predetermined region (e.g., a city or a specified radius from a location) specified by the cardholder and inputs those merchants into a matrix 800. In the example embodiment, matrix 800 includes merchants a, b, c, d, e, and f. The MA computer system obtains transaction data 802 for cardholders that have transacted with merchants a, b, c, d, e, and/or f during a specified time period 804 or window of observation 804. The transaction data is provided by a payment network.

Using the transaction data, the MA computer system populates matrix 800 to obtain a matrix of merchant associations 806. In the example embodiment, a cardholder must have transacted with two or more of merchants a, b, c, d, e, and f to be counted in matrix 806. This facilitates reducing an effect of cardholder bias toward a single merchant. In the example embodiment, for each pair of merchants a cardholder has transacted with, the MA computer system increments a counter associated with the merchant pair. For example, because $1^{st}$ cardholder transacted with merchants a and b, increments a value stored in block (a, b) of matrix 806 by a value of one. Additionally, block (b, a) is incremented by one. As shown in transaction data 802, both $2^{nd}$ and $4^{th}$ cardholders transacted with merchants e and b. Accordingly, the MA computer system increments blocks (e, b) and (b, e) by a value of two in matrix 806. Once complete with all of the transaction data, matrix of merchant associations 806 provides a measure of the associations between each pair of merchants based on how often each cardholder transacts with both merchants of the pair. Additionally, matrix of merchant associations 806 illustrates a popularity of each merchant relative to the other merchants based on historical data, free from cardholder bias.

Referring back to FIG. 7, after creating the merchant association matrix, the MA computer system receives 708 candidate cardholder preference information from a candidate cardholder included within the plurality of cardholders for one or more merchant of the plurality of merchants. Candidate cardholder preference information is inputted to the MA computer system by the candidate cardholder using a recommender app, for example, recommender app 119 (shown in FIGS. 2 and 3) stored on a cardholder computing device, such as a Smartphone. In one embodiment, candidate cardholder preference information is obtained by the MA computer system by analyzing historical transaction data associated with the candidate cardholder for merchants transacted with. In another embodiment, to provide candidate cardholder preference information, the candidate cardholder manually selects at least one merchant from a list of merchants within a predetermined geographical region. The list of merchants is generated by the MA computer system based on a geographical region selectable by the candidate cardholder. In another embodiment, candidate cardholder preference information is obtained from "friends" associated with the candidate cardholder on a social networking website, and/or from experts subscribed to by the cardholder on a social networking website. Candidate cardholder preference information may include results from surveys, Internet website scraping, solicited and unsolicited opinion data, satisfaction scale input, and/or other ranking acquisition methods. Moreover, candidate cardholder preference information may relate to an overall experience with a merchant.

In the example embodiment, based on the cardholder merchant preferences, the MA computer system creates 710 a candidate cardholder preference vector. The candidate cardholder preference vector represents a measurement of the candidate cardholder's preference for one merchant relative to at least one other merchant of the plurality of merchants. In one embodiment, cardholder merchant preferences are associated with a score for each merchant. For example, the preference may be measured on a scale of 1 to 10, or on a 5-star scale. In another embodiment, a value of one is associated with each merchant selected by the candidate cardholder from a list and aggregated. In a further embodiment, each merchant is associated with a magnitude based on a gratuity amount inferred from the historical transaction information. Regardless of the preference measurement chosen, the MA computer system normalizes the candidate cardholder preference vector such that each merchant is given a value, and the values for the plurality of merchants sums to one, which provides a scaled candidate cardholder preference vector that is biased based on the candidate cardholder's merchant preferences.

After obtaining the merchant preference vector, the MA computer system applies 712 the candidate cardholder preference vector to the matrix of merchant associations to determine a merchant ranking vector. The merchant ranking vector is associated with the candidate cardholder preference information and includes a merchant rank associated with each merchant of the plurality of merchants. The merchant rank represents a level or a measure of general popularity of each merchant relative to the plurality of merchants that is adjusted according to the candidate cardholder preference information.

The MA computer system then creates and applies 714 a neutral preference vector to the matrix of merchant associations to determine a neutral merchant ranking vector. The neutral preference vector includes generic preference information that is equal for each merchant of the plurality of merchants. The neutral merchant ranking vector includes a neutral merchant rank associated with each merchant of the plurality of merchants. The neutral merchant rank represents a measure of general popularity of each merchant relative to the plurality of merchants among the plurality of cardholders.

The MA computer system compares 716 the neutral merchant ranking vector to the merchant ranking vector to determine a merchant score vector for the candidate cardholder. The merchant score vector includes a merchant score indicating the difference between the merchant rank and the neutral merchant rank associated with each merchant of the plurality of merchants. The merchant score represents a measure of recommendation for each merchant of the plurality of merchants determined by the MA computer system for the candidate cardholder.

In the example embodiment, the MA computer system sorts 718 the merchant score vector in descending order based on the merchant score associated with each merchant of the plurality of merchants. More specifically, in the example embodiment, the merchant having the highest merchant score is placed first in the merchant score vector and the merchant having the lowest merchant score is placed last in the merchant score vector. In one embodiment, the MA computer system associates a relative score with each merchant to show each merchant's relative rank increase as related to the plurality of merchants. The MA computer system then provides 720 a list of recommended merchants to the candidate cardholder, wherein the list is based on the sorted merchant score vector.

Figure 9:
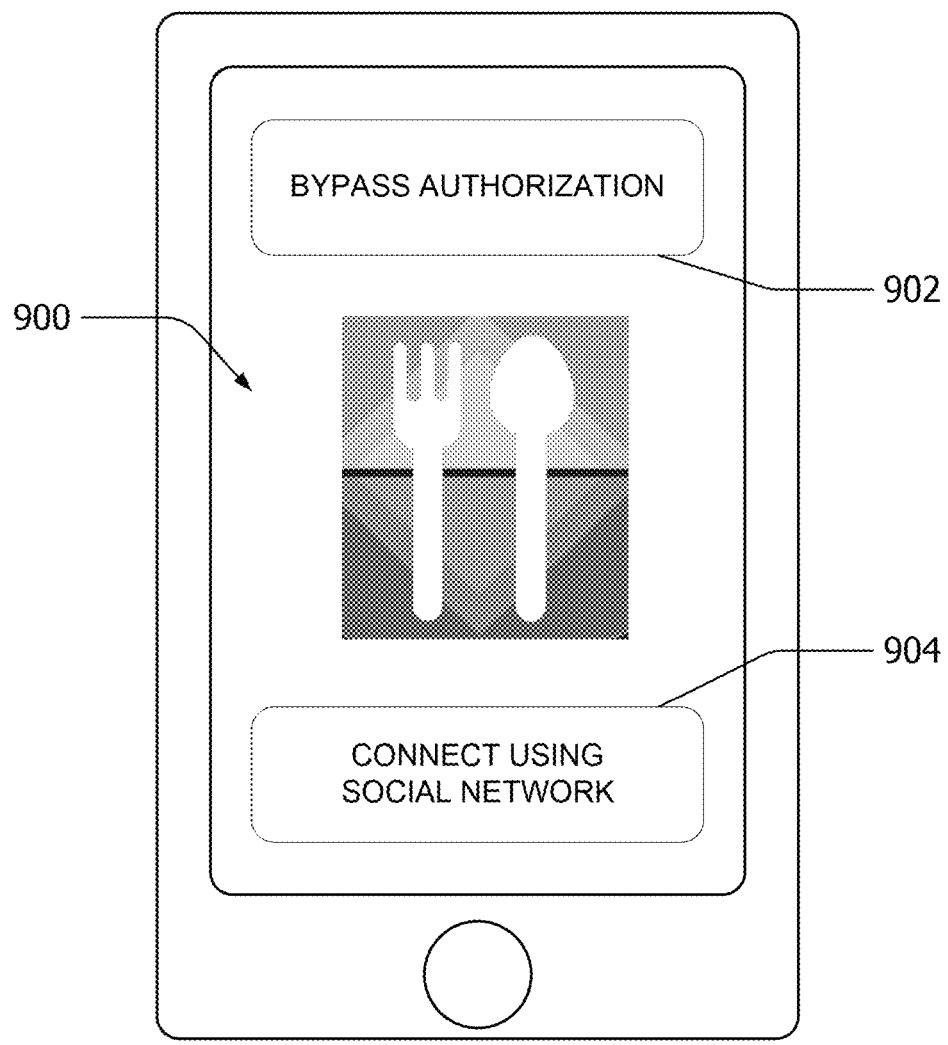

FIG. 9 is a screen shot of an initial screen 900 displayed by recommender app 119 (shown in FIG. 2) that may be used by a cardholder, such as a candidate cardholder, to interface with MA computer system 121 (shown in FIG. 2). In the example embodiment, recommender app 119 is stored on cardholder computing device 118 (shown in FIG. 2) and is in communication with MA computer system 121. In the example embodiment, initial screen 900 includes a "bypass authorization" selection 902 and a "connect using social network" selection 904. In the example embodiment, if candidate cardholder 22 chooses bypass authorization selection 902, then cardholder 22 is not required to enter credentials and is directed to a filter screen (shown in FIG. 10).

In the example embodiment, if cardholder 22 chooses connect using social network selection 904, then cardholder 22 is directed to an authorization screen (not shown), wherein login credentials of cardholder 22 for the social network are requested. Once authorized and logged in, MA computer system 121 may use social network "friends" of cardholder 22 to determine cardholder preference information for cardholder 22, as described in FIG. 7. To use social network friends as preferences, each friend chosen either authorizes MA computer system 121 to analyze such friend's historical transaction data or registers with MA computer system 121 and manually selects preferred merchants. Cardholder 22 may either specify at least one social network friend for MA computer system 121 to analyze, or MA computer system 121 analyzes all friends of cardholder 22. Once the list of friends is determined, MA computer system 121 uses each selected friend's preferences to determine cardholder preference information for cardholder 22.

In the case where cardholder 22 and at least one social network friend transact at merchant 24 together, MA computer system 121 enhances its recommendations by merging cardholder preference information for cardholder 22 and the preference information associated with the friend. In some embodiments, if cardholder 22 selects friends near the same age as cardholder 22 from the list, sports bars may be ranked relatively higher than if, for example, the parents of cardholder 22 were selected. Moreover, a gender of cardholder 22 may also affect the listing of merchant recommendations. For example, if a female cardholder 22 selects friends of the same age, sports bars may not be ranked as highly in the listing of merchant recommendations as they would for a male cardholder 22 given all other aspects of the relative ranking determination are similar.

In an alternate embodiment, cardholder 22 may subscribe to at least one merchant expert through a website or a social networking site. In such an embodiment, cardholder preference information is determined based on merchant ratings and/or historical transaction data associated with the expert.

Figure 10:
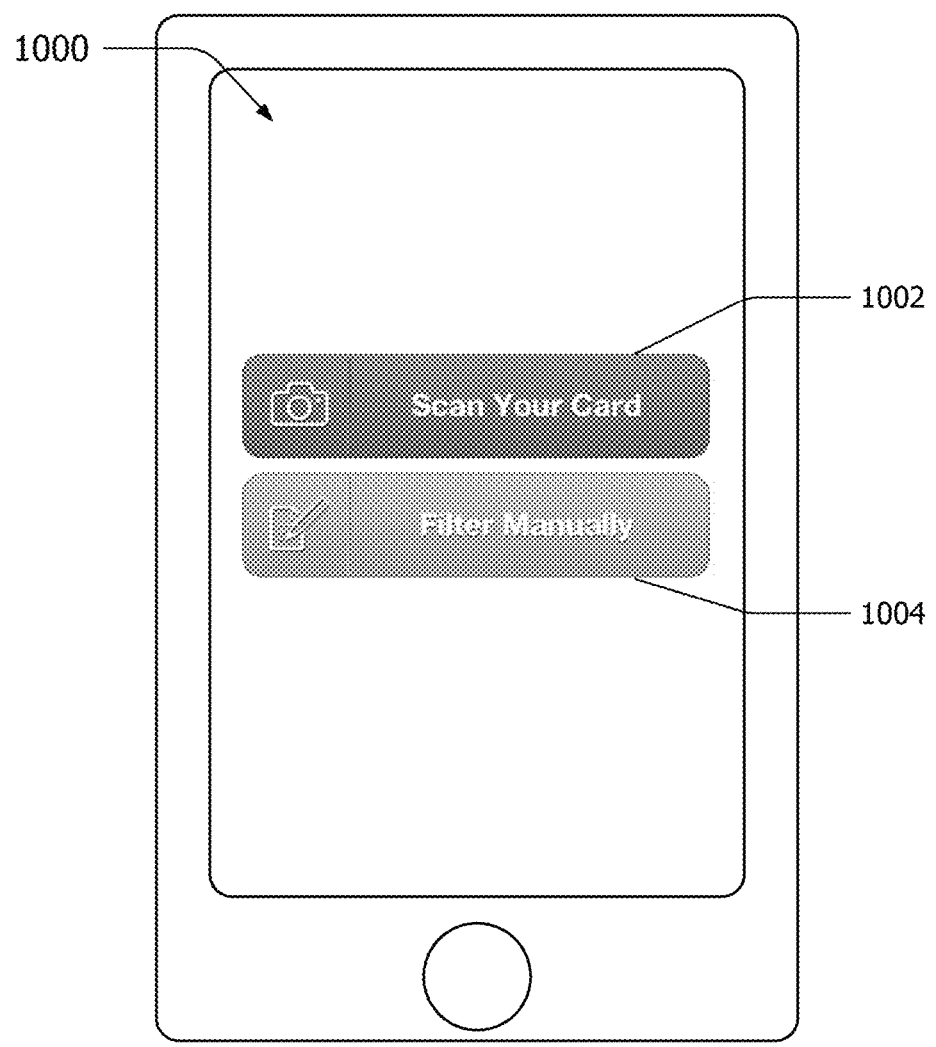

FIG. 10 is a screen shot displayed within recommender app 119 (shown in FIG. 2) showing a filter screen 1000 that may be used by a cardholder to interface with MA computer system 121 (shown in FIG. 2). Filter screen 1000 is displayed when a cardholder chooses to bypass authorization at initial screen 900 (shown in FIG. 9). Because authorization was bypassed initially, candidate cardholder 22 has to manually provide candidate cardholder preference information to MA computer system to receive merchant recommendations. In the example embodiment, filter screen 1000 includes a "scan card" selection 1002 and a "filter manually" selection 1004. In the example embodiment, if cardholder 22 chooses filter manually selection 1004, then cardholder 22 is directed to a filter manually screen 1100 (shown in FIG. 11).

In the example embodiment, if cardholder 22 chooses scan card selection 1002, then cardholder 22 uses a camera (not shown) installed on cardholder computing device 118 (shown in FIG. 2) to scan the front of a transaction card. Via recommender app 119, cardholder computing device 118 transmits the scanned card data to MA computer system 121, which uses the transaction card data to request historical transaction information for cardholder 22 from payment network 28 (shown in FIG. 1). In the example embodiment, historical transaction information is stored in database 120 (shown in FIG. 2) associated with payment network 28. MA computer system 121 uses the historical transaction information to determine cardholder preference information for cardholder 22, as described in FIG. 7. In an alternate embodiment, transaction card information may be input into cardholder computing device 118 manually, using a magnetic stripe reader, a key fob, a touch screen and/or any other method of inputting transaction card data into a device that enables recommender app 119 to function as described herein.

Figure 11:
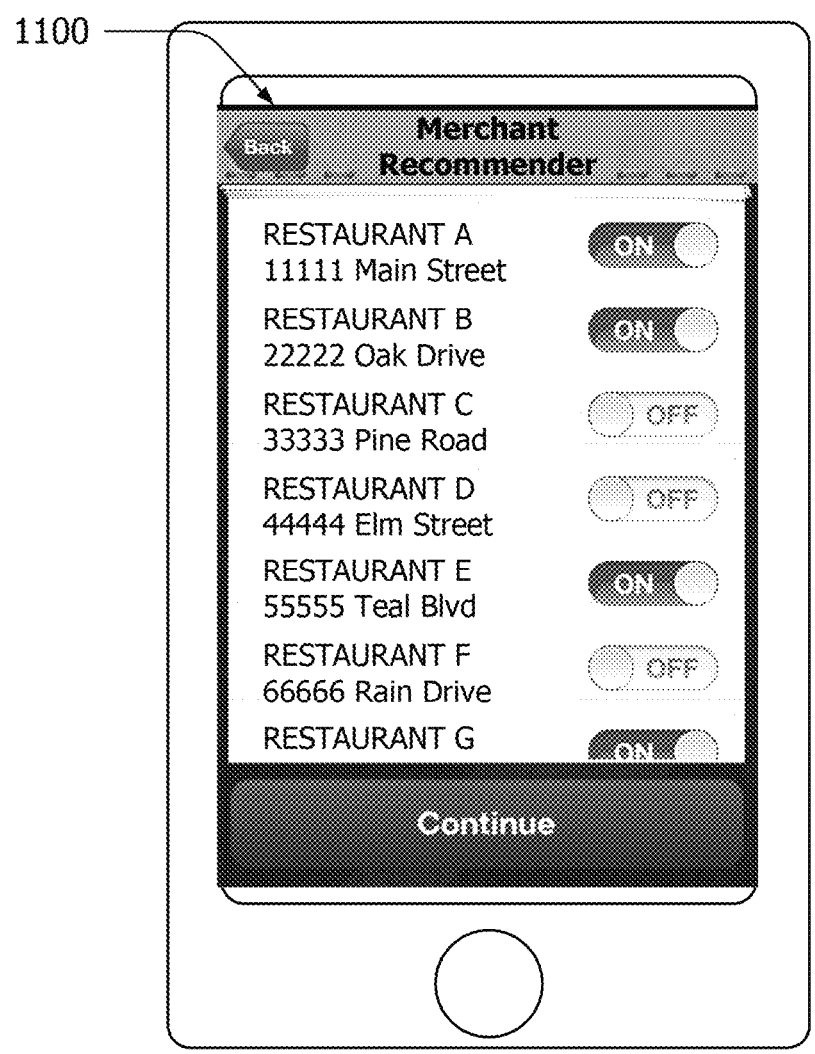

FIG. 11 is a screen shot displayed within recommender app 119 (shown in FIG. 2) showing a filter manually screen 1100 that may be used by a cardholder to interface with MA computer system 121 (shown in FIG. 2). In the example embodiment, filter manually screen 1100 displays a list of merchants 24 from which cardholder 22 chooses at least one. From the at least one selected merchant 24, MA computer system 121 determines candidate cardholder preference information for cardholder 22, as described in FIG. 7. Although cardholder 22 must select a minimum of one merchant 24 to enable MA computer system 121 to determine a recommendation, selecting more merchants 24 enables MA computer system 121 to expand the matrix (shown in FIG. 7) and generate a more accurate ranked list of merchants 24.

To generate the list of merchants 24, in the example embodiment, MA computer system 121 is programmed to determine location information of each of the plurality of different merchants 24 relative to a predetermined selectable location and/or a current location of cardholder 22. For example, a cardholder that uses cardholder computing device 118 (shown in FIG. 2) having a GPS capability can use the determined location information to order a listing of merchants 24 by distance from a current location of cardholder 22 or a location chosen by cardholder 22, for example, a hotel in a distant city where cardholder 22 will be staying during an upcoming trip. In one embodiment, cardholder 22 located in one city may order a listing of merchants 24 in a distant city using restaurants from a second distant city. For example, cardholder 22 may be located in New York City and order a listing of merchants 24 in Seattle, while basing cardholder preference information for cardholder 22 on selections of merchants 24 located in Dallas.

Figure 12:

FIG. 12 is a screen shot displayed within recommender app 119 (shown in FIG. 2) showing a list 1200 of recommended merchants generated by MA computer system 121 (shown in FIG. 2). In the example embodiment, list 1200 is determined using the methods described in FIG. 7. Once the rankings are determined, ranked list 1200 is formatted and displayed on cardholder computing device 118 (shown in FIG. 2) via recommender app 119. In an alternate embodiment, ranked list 1200 is displayed to cardholder 22 on a website communicatively coupled to a network such as an intranet, WAN, or the Internet.

Figure 13:
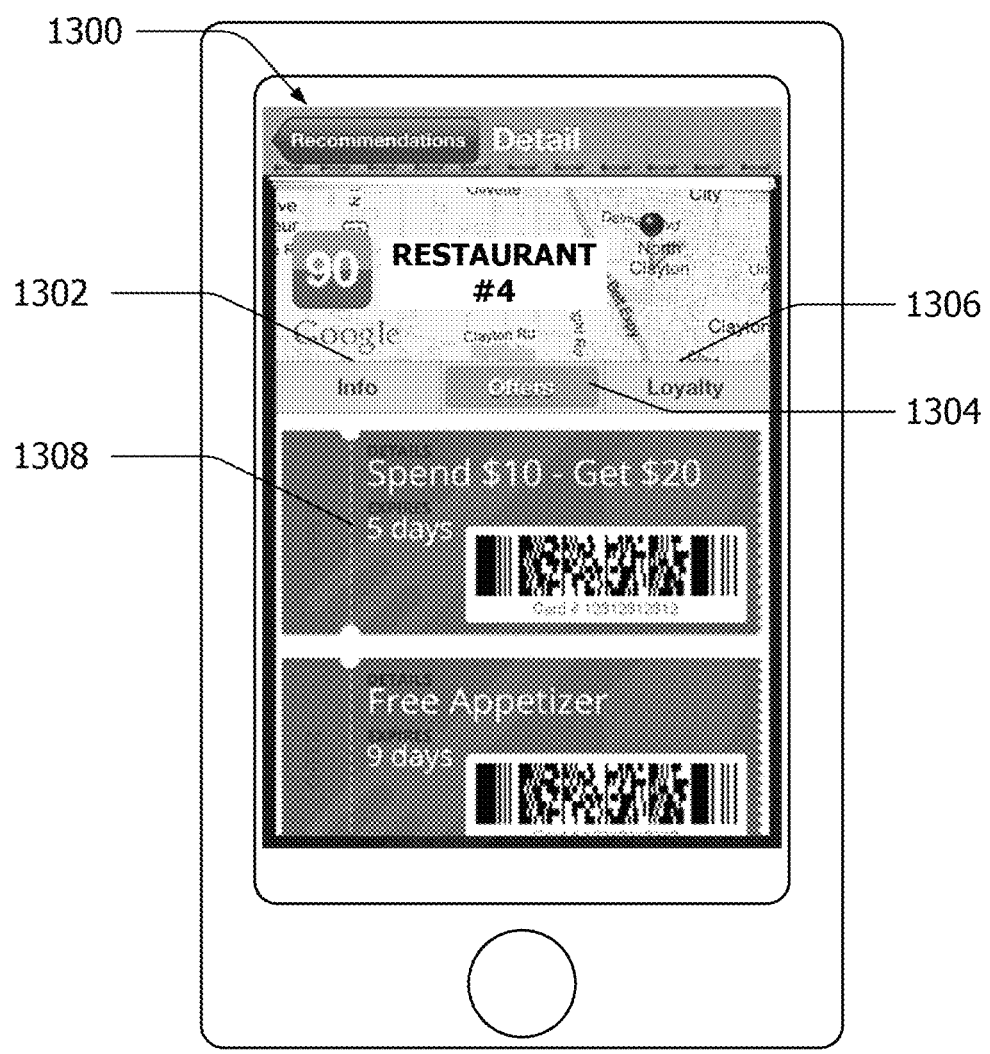

FIG. 13 is a screen shot displayed within recommender app 119 (shown in FIG. 2) showing a merchant detail screen 1300. Upon selecting a merchant from list 1200 (shown in FIG. 12), cardholder 22 is directed to merchant detail screen 1300 where more information about merchant 24 may be displayed to cardholder 22. In the example embodiment, merchant detail screen 1300 includes an information tab 1302, an offers tab 1304, and a loyalty tab 1306. Details from each of tabs 1302, 1304, and 1306 are displayed in a display area 1308 when selected by cardholder 22.

In the example embodiment, information tab 1302 displays information about merchant 24 in display area 1308. For example, information tab 1302 may display an address, phone number, website, hours of operation, reviews by other customers, menu or services provided, and/or any other desired information related to merchant 24.

In the example embodiment, offers tab 1304 displays coupons or special offers associated with merchant 24 in display area 1308. Merchant 24 controls the offers displayed, as is described in more detail herein. The display of an offer may include details and restrictions related to the offer, as well as an expiration date. The offer may include a bar code relating to at least one of a payment card of cardholder 22, a loyalty card, and/or details of the offer. Further, the bar code may be scanned by merchant 24 using a merchant Smartphone or the like.

In the example embodiment, loyalty tab 1306 displays loyalty and rewards information associated with merchant 24 in display area 1308. In the example embodiment, MA computer system 121 is programmed to determine a quantity of rewards points awarded to cardholder 22 based on the received transaction information wherein the quantity of rewards points is related to a combination of a transaction amount, a reward formula associated with merchant 24 awarding the reward points, a time of use of the payment card transaction, a rewards points tier of cardholder 22, a rewards points special sponsored by merchant 24 awarding the reward points, and a frequency of cardholder payment card transactions with merchant 24 awarding the reward points. Additionally, MA computer system 121 is programmed to recommend at least one of the plurality of merchants 24 that accept the payment card based on payment card transactions of other cardholders 22.

Figure 14:
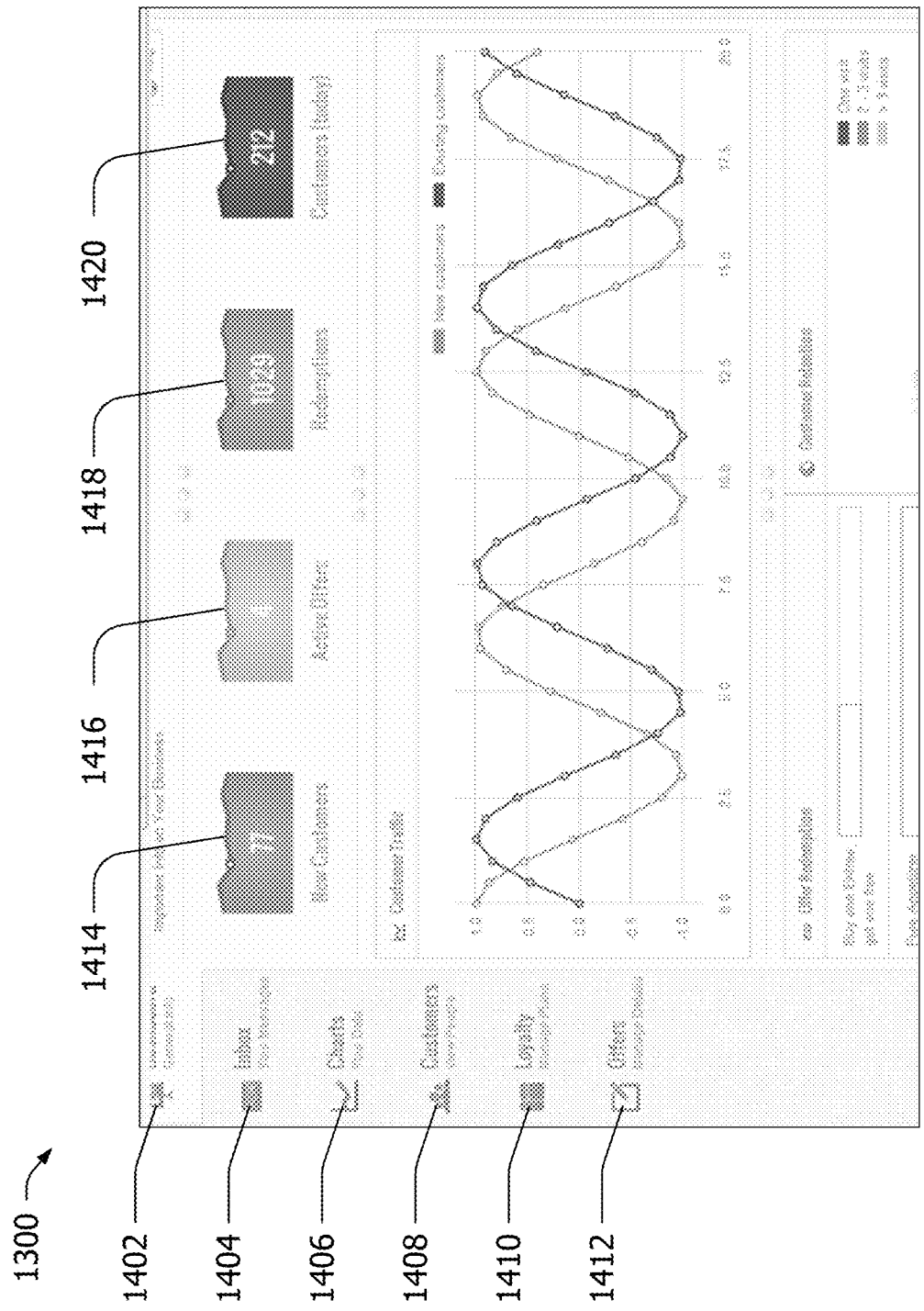

FIG. 14 is a screen shot of a merchant portal 1400 that interfaces between a merchant using client system 114 and MA computer system 121 (both shown in FIG. 2). In the example embodiment, merchant portal 1400 includes a dashboard tab 1402, a message inbox tab 1404, a charts tab 1406, a customer details tab 1408, a loyalty tab 1410, and an offers tab 1412.

In the example embodiment, dashboard tab 1402 displays information regarding the business of merchant 24. More specifically, in the example embodiment, dashboard tab 1402 includes a new customer counter 1414 configured to display an amount of new customers over a predefined period of time, an active offers counter 1416 configured to display a number of active offers merchant 24 currently has available, a redemptions counter 1418 configured to display a number of offers redeemed, and a customer counter 1420 configured to display a number of customers seen during the current day.

In the example embodiment, message inbox tab 1404 enables merchant 24 to interact with customers regarding any aspect of the business of merchant 24. For example, a customer may contact merchant 24 to ask about redeeming an offer or coupon, to report a positive or negative experience, to ask directions to the place of business of merchant 24, etc.

In the example embodiment, charts tab 1406 displays various detailed charts regarding data and statistics of merchant 24. For example, charts tab 1406 may include a chart displaying a customer traffic relationship between new and existing customers, a chart displaying a number of redemptions over a predetermined period (i.e., weekly, monthly, or yearly), a chart displaying a number new customers over a predetermined period (i.e., weekly, monthly, or yearly). In some embodiments, MA computer system 121 generates charts relating to certain demographics of customers in the area of merchant 24 and displays percentages as to how many customers transact with merchant 24 compared to competitors of merchant 24.

Figure 15:
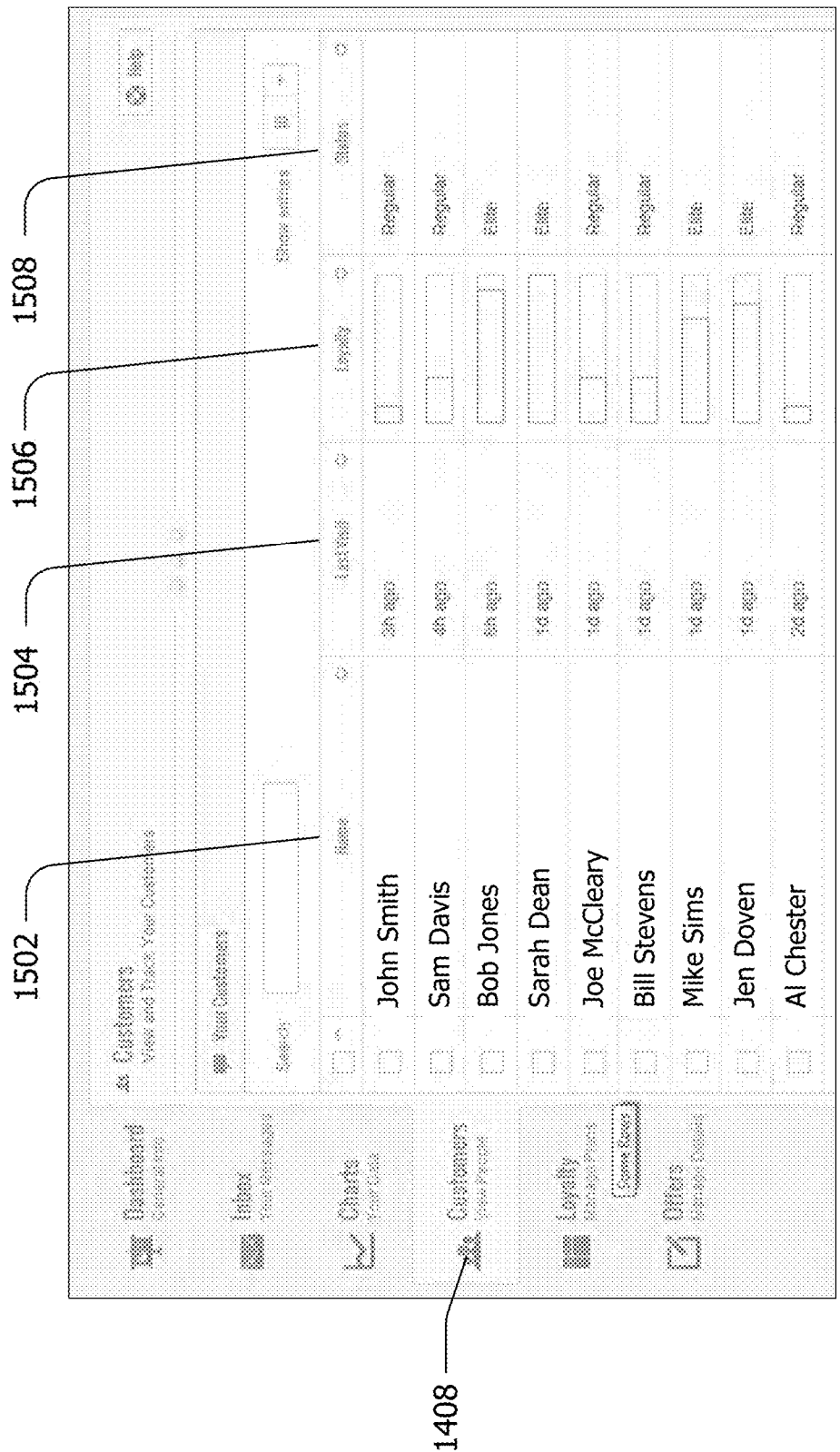

FIG. 15 is a screen shot showing customer details tab 1408 which is accessible through merchant portal 1400

(both shown in FIG. 14). In the example embodiment, customer details tab 1408 enables merchant 24 to view and track customers that have transacted with merchant 24. More specifically, in the example embodiment, customer details tab 1408 includes a name column 1502, a last visit column 1504, a loyalty column 1506, and a status column 1508. Name column 1502 displays a list of customers by name or other customer identifier. In the example embodiment, a cardholder having a payment card associated with payment network 28 (shown in FIG. 1) is automatically enrolled in all loyalty programs associated with all merchants 24 associated with payment network 28. Alternatively, cardholder 22 may be required to affirmatively enroll in loyalty programs. Last visit column 1504 displays the last date in which the customer visited and/or transacted with merchant 24. Loyalty column 1506 displays an amount of loyalty rewards the customer has received and how many are necessary to earn points or a gift. Status column 1508 indicates a status of the customer and may be based on at least one of an amount of money spent over a predetermined time, a number of visits to merchant 24, and/or a number of completed transactions.

Figure 16:
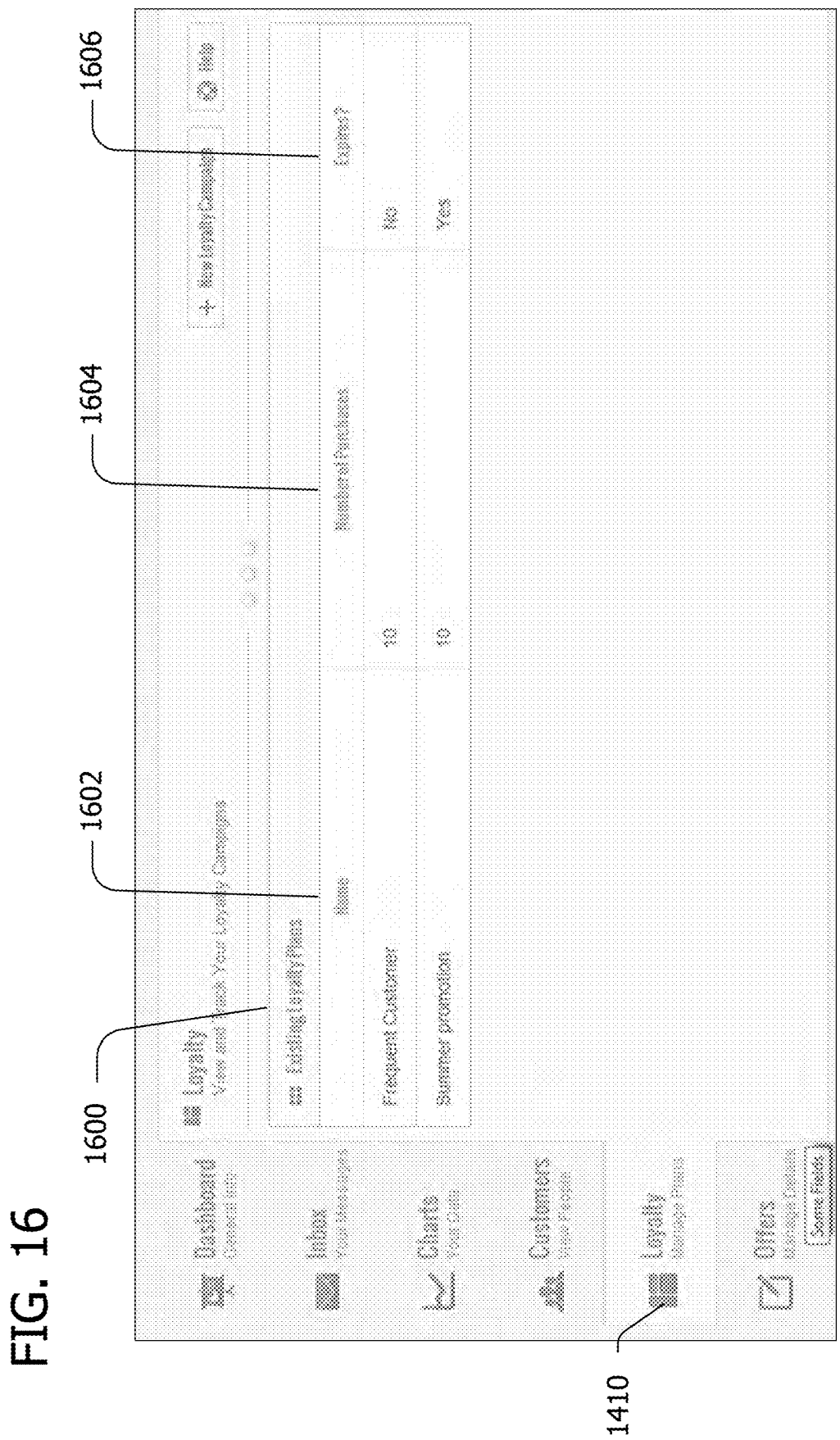

FIG. 16 is a screen shot showing loyalty tab 1410 which is accessible through merchant portal 1400 (both shown in FIG. 14). In the example embodiment, loyalty tab 1410 enables merchant 24 to view, track, and create loyalty campaigns. An existing loyalty plans chart 1600 displays loyalty plans currently offered by merchant 24. In the example embodiment, chart 1600 includes a name column 1602 that displays loyalty plan names, a number of purchases column 1604 that displays a number of purchases merchant 24 has required for the customer to earn the reward, and an expiration column 1606 that displays whether the loyalty campaign expires after a predefined period of time. Alternatively, number of purchases column 1604 may be substituted with any other requirement, including, but not limited to, an amount of money spent over a predetermined time and a number of visits to merchant 24.

Figure 17:
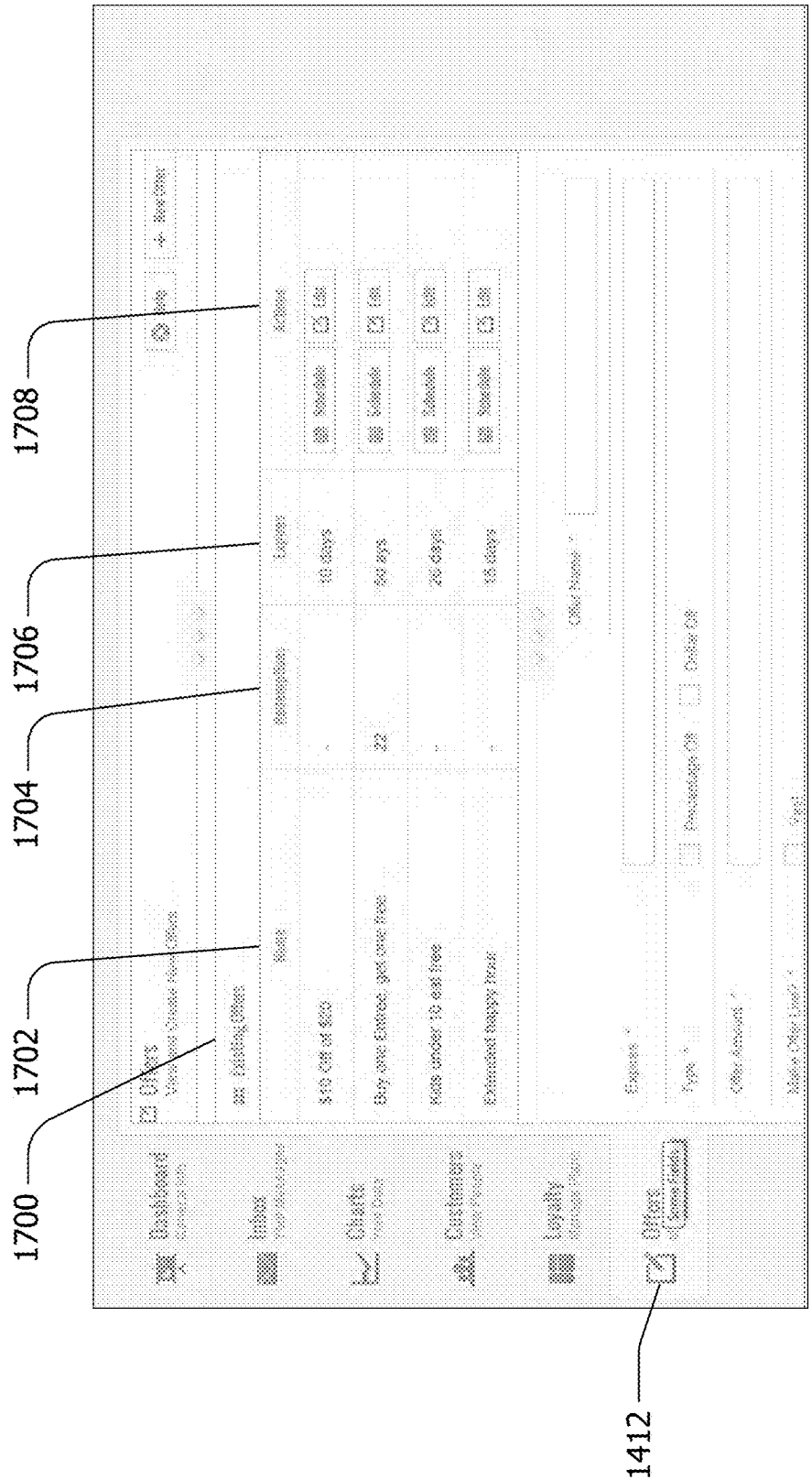

FIG. 17 is a screen shot showing offers tab 1412 which is accessible through merchant portal 1400 (both shown in FIG. 14). In the example embodiment, offers tab 1412 enables merchant 24 to view existing offers and create new offers. An existing offers chart 1700 displays offers currently being offered by merchant 24. In the example embodiment, chart 1700 includes a name column 1702 that displays offer names, a number of redemptions column 1704 that displays a number of times each offer has been redeemed, an expiration column 1706 that displays whether the loyalty campaign expires after a predefined period of time, and an actions column 1708 that enables merchant 24 to schedule actions or edit the existing offers.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable storage medium" and "computer-readable storage medium" refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term "machine-readable signal" refers to any signal used to provide machine instructions and/or data to a programmable processor. The machine-readable storage medium and computer-readable medium do not include transitory signals.

The above-described embodiments of a method and system of ranking merchants according to a cardholder's preferences and purchasing behaviors provides a cost-effective and reliable means for maintaining contact with a customer by merchants and a network interchange provider. As a result, the methods and systems described herein facilitate leveraging an payment network's assets to engage cardholders and merchants in an enhanced purchasing experience in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for recommending at least one merchant of a plurality of merchants to a candidate cardholder, said computer system comprising:
  a memory device for storing data; and
  a processor in communication with said memory device and a payment network, said processor programmed to:
    identify a plurality of merchants registered to use the payment network;
    retrieve, from the payment network, data signals including electronic payment transaction information for a plurality of electronic payment card transactions involving a plurality of cardholders including the candidate cardholder and the plurality of merchants;

generate, based upon a predetermined region, a subset of the electronic payment transaction information for the plurality of electronic payment card transactions involving at least some of the plurality of cardholders and selected merchants of the plurality of merchants located within the predetermined region;

identify, from the subset of electronic payment transaction information, a subset of cardholders from the plurality of cardholders, each of the subset of cardholders having completed electronic payment transactions with at least two of the plurality of merchants;

create, based on the subset of the electronic payment transaction information associated with the subset of cardholders, a merchant popularity matrix, wherein the merchant popularity matrix indicates a number of transactions associated with each pair of selected merchants located within the predetermined region, wherein, to create the matrix, the number of transactions is incremented when a cardholder in the subset of cardholders completes electronic payment transactions at both merchants in the pair, and wherein, to reduce an effect of cardholder bias toward a single merchant, the number of transactions in the merchant popularity matrix is not incremented when a cardholder completes multiple electronic payment transactions at the same merchant;

receive, from an application on a user device of the candidate cardholder, data signals including input data including preference data of the candidate cardholder, wherein the user device is in communication with the processor via the application, wherein the input data is entered into the application by the candidate cardholder on the user device, and wherein the preference data represents preferences of the candidate cardholder for particular merchants of the plurality of merchants;

determine a candidate cardholder preference vector of the candidate cardholder based upon the received input data;

apply the merchant popularity matrix to the candidate cardholder preference vector to create a candidate cardholder merchant ranking vector;

apply the merchant popularity matrix to a neutral preference vector to create a general merchant ranking vector;

determine a merchant score vector based on a difference between the candidate cardholder merchant ranking vector and the general merchant ranking vector, wherein the merchant score vector includes a merchant score associated with each merchant of the plurality of merchants;

create a list of recommended merchants by sorting the merchant score vector based on the merchant score of each merchant; and provide content configured to cause the list of recommended merchants to be displayed through the application on the user device of the candidate cardholder.

2. A computer system in accordance with claim 1, wherein the processor is further programmed to:

retrieve a merchant type for each merchant of the at least some of the plurality of merchants in the electronic payment transaction information; and update the list of recommended merchants based upon the retrieved merchant type.

3. A computer system in accordance with claim 1, wherein said processor is further programmed to:

determine the candidate cardholder preference vector based further upon historical transaction data, wherein the historical transaction data is included in the input data, and wherein the historical transaction data is captured by the payment network from electronic payment transactions of the candidate cardholder;

extract, from the historical transaction data, gratuity data including a gratuity amount; and update the candidate cardholder preference vector based on each merchant of the plurality of merchants being assigned a magnitude, wherein the magnitude is based on the gratuity amount.

4. A computer system in accordance with claim 3, wherein said processor is programmed to determine the candidate cardholder preference vector by at least one of:

analyzing the historical transaction data associated with the candidate cardholder for merchants transacted with;

receiving, as input data through the application on the user device, at least one manual selection made by the candidate cardholder from a list of the plurality of merchants;

analyzing social networking preferences of at least one associated contact selected by the candidate cardholder through the application on the user device on a social networking website, wherein the social network preferences are included in the input data; and analyzing expert preferences of at least one merchant expert selected by the candidate cardholder through the application on the user device, wherein the expert preferences are included in the input data.

5. A computer system in accordance with claim 1, wherein said processor is programmed to determine the candidate cardholder preference information based on input data inputted into the application on the user device by the candidate cardholder.

6. A computer system in accordance with claim 1, wherein the neutral preference vector includes generic preference information that is the same for each merchant of the plurality of merchants.

7. A computer system in accordance with claim 1, wherein said processor is further programmed to:

receive, through the application on the user device, location data of the candidate cardholder, wherein the location data includes at least one of a predetermined selectable location and a current location of the candidate cardholder, wherein the predetermined selectable location is input into the application by the candidate cardholder, and wherein the current location of the candidate cardholder is determined using GPS capability of the user device;

determine a proximity of the plurality of merchants to the location data;

update the merchant score for each merchant of the plurality of merchants based on the determined proximity; and sort the merchant score vector in descending order based on the updated merchant scores.

8. A computer system in accordance with claim 1, wherein said processor is further programmed to interface between the candidate cardholder using the user device and a particular merchant using a merchant computing device by at least one of:

enabling cardholder experience feedback to be communicated from the user device to the merchant computing device;
enabling the merchant computing device to communicate offers to the user device; and
displaying loyalty rewards points earned by the candidate cardholder on the user device.

9. A computer system in accordance with claim 1, wherein said processor is further programmed to communicate statistical information to a particular merchant of the plurality of merchants, the statistical information including at least one of a number of new customers over a specified time period, an amount of active offers currently being made by the particular merchant, an amount of active offers redeemed by customers, an amount of customers transacted with during a specified time period, and statistical information for nearby competitors of the particular merchant.

10. A computer system in accordance with claim 1, wherein the electronic payment transactions occur during a predetermined time period and within a predetermined geographical region.

11. A computer system in accordance with claim 1, wherein the plurality of merchants are associated with the same market segment.

12. A computer system in accordance with claim 1, wherein the processor is further programmed to:
   receive, from an application on a user device of the candidate cardholder, location information of the candidate cardholder; and
   determine, based upon the location information, a predetermined region associated with the candidate cardholder.

13. A computer-implemented method of recommending at least one merchant of a plurality of merchants to a candidate cardholder using a merchant analytic (MA) computer system, wherein the MA computer system is in communication with a memory device and a payment network, said method comprising:
   identifying a plurality of merchants registered to use the payment network;
   retrieving, from the payment network, data signals including electronic payment transaction information for a plurality of electronic payment card transactions involving a plurality of cardholders including the candidate cardholder and of the plurality of merchants;
   generating, based upon a predetermined region, a subset of the electronic payment transaction information for the plurality of electronic payment card transactions involving at least some of the plurality of cardholders and selected merchants of the plurality of merchants located within the predetermined region;
   identifying, from the subset of electronic payment transaction information, a subset of cardholders from the plurality of cardholders, each of the subset of cardholders having completed electronic payment transactions with at least two of the plurality of merchants;
   creating, based on the subset of the electronic payment transaction information associated with the subset of cardholders, a merchant popularity matrix, wherein the merchant popularity matrix indicates a number of transactions associated with each pair of selected merchants located within the predetermined region, wherein, to create the matrix, the number of transactions is incremented when a cardholder in the subset of cardholders completes electronic payment transactions at both merchants in the pair, and wherein, to reduce an effect of cardholder bias toward a single merchant, the number of transactions in the merchant popularity matrix is not incremented when a cardholder completes multiple electronic payment transactions at the same merchant;
   receiving, from an application on a user device of the candidate cardholder, data signals including input data including preference data of the candidate cardholder, wherein the user device is in communication with the processor via the application, wherein the input data is entered into the application by the candidate cardholder on the user device, and wherein the preference data represents preferences of the candidate cardholder for particular merchants of the plurality of merchants;
   determining a candidate cardholder preference vector of the candidate cardholder based upon the received input data;
   applying the merchant popularity matrix to the candidate cardholder preference vector to create a candidate cardholder merchant ranking vector;
   applying the merchant popularity matrix to a neutral preference vector to create a general merchant ranking vector;
   determining a merchant score vector based on a difference between the candidate cardholder merchant ranking vector and the general merchant ranking vector, wherein the merchant score vector includes a merchant score associated with each merchant of the plurality of merchants;
   creating a list of recommended merchants by sorting the merchant score vector based on the merchant score of each merchant; and
   providing content configured to cause the list of recommended merchants to be displayed through the application on the user device of the candidate cardholder.

14. The method in accordance with claim 13 further comprising:
   retrieving a merchant type for each merchant of the at least some of the plurality of merchants in the electronic payment transaction information; and
   updating the list of recommended merchants based upon the retrieved merchant type.

15. The method in accordance with claim 13 further comprising:
   determining the candidate cardholder preference vector based further upon historical transaction data, wherein the historical transaction data is included in the input data, and wherein the historical transaction data is captured by the payment network from electronic payment transactions of the candidate cardholder;
   extract, from the historical transaction data, gratuity data including a gratuity amount; and
   update the candidate cardholder preference vector based on each merchant of the plurality of merchants being assigned a magnitude, wherein the magnitude is based on the gratuity amount.

16. The method in accordance with claim 13 wherein the neutral preference vector includes generic preference information that is the same for each merchant of the plurality of merchants.

17. The method in accordance with claim 13 further comprising:
   receiving, through the application on the user device, location data of the candidate cardholder, wherein the location data includes at least one of a predetermined selectable location and a current location of the candidate cardholder, wherein the predetermined selectable location is input into the application by the candidate cardholder, and wherein the current location of the candidate cardholder is determined using GPS capability of the user device;

determining a proximity of the plurality of merchants to the location data;

updating the merchant score for each merchant of the plurality of merchants based on the determined proximity; and sorting the merchant score vector in descending order based on the updated merchant scores.

18. One or more non-transitory computer-readable storage media having computer-executable instructions embodied thereon for recommending at least one merchant of a plurality of merchants to a candidate cardholder, wherein when executed by at least one processor in communication with a payment network, the computer-executable instructions cause the processor to:

identify a plurality of merchants registered to use the payment network;

retrieve, from the payment network, data signals including electronic payment transaction information for a plurality of electronic payment card transactions involving a plurality of cardholders including the candidate cardholder and the plurality of merchants;

generate, based upon a predetermined region, a subset of the electronic payment transaction information for the plurality of electronic payment card transactions involving at least some of the plurality of cardholders and selected merchants of the plurality of merchants located within the predetermined region;

identify, from the subset of electronic payment transaction information, a subset of cardholders from the plurality of cardholders, each of the subset of cardholders having completed electronic payment transactions with at least two of the plurality of merchants;

create, based on the subset of the electronic payment transaction information, a merchant popularity matrix associated with the subset of cardholders, wherein the merchant popularity matrix indicates a number of transactions associated with each pair of selected merchants located within the predetermined region, wherein, to create the matrix, the number of transactions is incremented when a cardholder in the subset of cardholders completes electronic payment transactions at both merchants in the pair, and wherein, to reduce an effect of cardholder bias toward a single merchant, the number of transactions in the merchant popularity matrix is not incremented when a cardholder completes multiple electronic payment transactions at the same merchant;

receive, from an application on a user device of the candidate cardholder, data signals including input data including preference data of the candidate cardholder, wherein the user device is in communication with the processor via the application, wherein the input data is entered into the application by the candidate cardholder on the user device, and wherein the preference data represents preferences of the candidate cardholder for particular merchants of the plurality of merchants;

determine a candidate cardholder preference vector of the candidate cardholder based upon the received input data;

apply the merchant popularity matrix to the candidate cardholder preference vector to create a candidate cardholder merchant ranking vector;

apply the merchant popularity matrix to a neutral preference vector to create a general merchant ranking vector;

determine a merchant score vector based on a difference between the candidate cardholder merchant ranking vector and the general merchant ranking vector, wherein the merchant score vector includes a merchant score associated with each merchant of the plurality of merchants;

create a list of recommended merchants by sorting the merchant score vector based on the merchant score of each merchant; and provide content configured to cause the list of recommended merchants to be displayed through the application on the user device of the candidate cardholder.

19. The non-transitory computer-readable storage media of claim 18, wherein the computer-executable instructions further cause the processor to:

retrieve a merchant type for each merchant of the at least some of the plurality of merchants in the electronic payment transaction information; and update the list of recommended merchants based upon the retrieved merchant type.

* * * * *